(12) United States Patent
Tsukamoto

(10) Patent No.: US 7,186,160 B2
(45) Date of Patent: Mar. 6, 2007

(54) ELECTRON-EMITTING DEVICE, ELECTRON-EMITTING APPARATUS, IMAGE DISPLAY APPARATUS, AND LIGHT-EMITTING APPARATUS

(75) Inventor: Takeo Tsukamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 63 days.

(21) Appl. No.: 10/799,859

(22) Filed: Mar. 15, 2004

(65) Prior Publication Data

US 2004/0176010 A1 Sep. 9, 2004

Related U.S. Application Data

(62) Division of application No. 09/941,780, filed on Aug. 30, 2001.

(30) Foreign Application Priority Data

Sep. 1, 2000 (JP) .............................. 2000-265819
Aug. 24, 2001 (JP) .............................. 2001-255145

(51) Int. Cl.
*H01J 9/12* (2006.01)
(52) U.S. Cl. .............................. 445/50; 445/49; 445/51
(58) Field of Classification Search .................. 445/50
See application file for complete search history.

(56) References Cited

U.S. PATENT DOCUMENTS

| | | | |
|---|---|---|---|
| 4,728,851 A | 3/1988 | Lambe | ........................ 313/309 |
| 4,816,289 A | 3/1989 | Komatsu et al. | ......... 423/447.3 |
| 4,900,483 A | 2/1990 | Witzke et al. | ............. 264/29.2 |
| 4,904,895 A | 2/1990 | Tsukamoto et al. | ......... 313/336 |
| 4,956,578 A | 9/1990 | Shimizu et al. | ................. 315/3 |
| 5,066,883 A | 11/1991 | Yoshioka et al. | ........... 313/309 |
| 5,185,554 A | 2/1993 | Nomura et al. | ............. 313/495 |
| 5,192,240 A | 3/1993 | Komatsu | ..................... 445/24 |

(Continued)

FOREIGN PATENT DOCUMENTS

CN 1181607 A 5/1998

(Continued)

OTHER PUBLICATIONS

C.A. Spindt et al., *Physical Properties of thin-Film Field Emission Cathodes with Molybdenum Cones*, Journal of Applied Physics, vol.47, No. 12 (1976) pp. 5248-5263.

(Continued)

*Primary Examiner*—Mariceli Santiago
*Assistant Examiner*—Anne M Hines
(74) *Attorney, Agent, or Firm*—Fitzpatrick, Cella, Harper & Scinto

(57) ABSTRACT

An electron-emitting device in which the specific capacitance and the drive voltage are reduced, and which is capable of obtaining a finer electron beam by controlling the trajectory of emitted electrons. An electron-emitting portion of an electron-emitting member is positioned between the height of a gate and the height of an anode. When the distance between the gate and a cathode is d; the potential difference at driving the device is V1; the distance between the anode and the substrate is H; and the potential difference between the anode and the cathode is V2, then the electric field E1=V1/d during driving is configured to be within the range from 1 to 50 times E2=V2/H.

23 Claims, 13 Drawing Sheets

U.S. PATENT DOCUMENTS

| | | | |
|---|---|---|---|
| 5,214,346 A | 5/1993 | Komatsu | 313/309 |
| 5,382,867 A | 1/1995 | Yuji et al. | 313/309 |
| 5,443,859 A | 8/1995 | Nagata | 427/122 |
| 5,458,784 A | 10/1995 | Baker et al. | 210/674 |
| 5,500,200 A | 3/1996 | Mandeville et al. | 423/447.3 |
| 5,543,684 A | 8/1996 | Kumar et al. | 313/495 |
| 5,551,903 A | 9/1996 | Kumar et al. | 445/24 |
| 5,577,943 A | 11/1996 | Vickers et al. | 445/24 |
| 5,612,587 A | 3/1997 | Itoh et al. | 313/309 |
| 5,618,875 A | 4/1997 | Baker et al. | 524/495 |
| 5,690,997 A | 11/1997 | Grow | 427/249 |
| 5,726,524 A | 3/1998 | Debe | 313/309 |
| 5,770,918 A | 6/1998 | Kawate et al. | 313/495 |
| 5,773,921 A | 6/1998 | Keesmann et al. | 313/309 |
| 5,847,495 A | 12/1998 | Yamanobe et al. | 313/310 |
| 5,872,422 A | 2/1999 | Xu et al. | 313/311 |
| 5,872,541 A | 2/1999 | Yoshioka et al. | 345/74 |
| 5,935,639 A | 8/1999 | Sullivan et al. | 427/78 |
| 5,965,267 A | 10/1999 | Nolan et al. | 428/408 |
| 5,973,444 A | 10/1999 | Xu et al. | 313/309 |
| 5,981,305 A | 11/1999 | Hattori | 438/20 |
| 5,982,091 A | 11/1999 | Konishi | 313/495 |
| 5,986,389 A | 11/1999 | Tsukamoto | 313/309 |
| 6,087,765 A | 7/2000 | Coll et al. | 313/309 |
| 6,129,602 A | 10/2000 | Yamanobe | 445/24 |
| 6,135,839 A | 10/2000 | Iwase et al. | 445/24 |
| 6,147,449 A | 11/2000 | Iwasaki et al. | 313/495 |
| 6,171,162 B1 | 1/2001 | Iwasaki et al. | 445/6 |
| 6,184,610 B1 | 2/2001 | Shibata et al. | 313/309 |
| 6,204,597 B1 | 3/2001 | Xie et al. | 313/310 |
| 6,228,904 B1 | 5/2001 | Yadav et al. | 524/210 |
| 6,231,413 B1 | 5/2001 | Tsukamoto | 445/24 |
| 6,246,168 B1 | 6/2001 | Kishi et al. | 313/495 |
| 6,283,812 B1 | 9/2001 | Jin et al. | 445/24 |
| 6,288,494 B1 | 9/2001 | Tsukamoto et al. | 315/169.1 |
| 6,290,564 B1 | 9/2001 | Talin et al. | 445/50 |
| 6,313,572 B1 | 11/2001 | Yamada | 313/310 |
| 6,331,690 B1 | 12/2001 | Yudasaka et al. | 219/121.6 |
| 6,333,016 B1 | 12/2001 | Resasco et al. | 423/447.3 |
| 6,333,598 B1 * | 12/2001 | Hsu et al. | 313/495 |
| 6,390,612 B1 | 5/2002 | Kotaki et al. | 347/85 |
| 6,400,091 B1 | 6/2002 | Deguchi et al. | 315/169.1 |
| 6,413,487 B1 | 7/2002 | Resasco et al. | 423/447.3 |
| 6,420,726 B2 | 7/2002 | Choi et al. | 257/10 |
| 6,445,006 B1 | 9/2002 | Brandes et al. | 257/76 |
| 6,448,709 B1 | 9/2002 | Chuang et al. | 313/497 |
| 6,455,021 B1 | 9/2002 | Saito | 423/447.3 |
| 6,471,936 B1 | 10/2002 | Chen et al. | 423/658.2 |
| 6,472,814 B1 | 10/2002 | Yamanobe et al. | 313/495 |
| 6,624,589 B2 | 9/2003 | Kitamura et al. | 315/169.3 |
| 6,626,719 B2 | 9/2003 | Ono et al. | 445/24 |
| 6,628,053 B1 | 9/2003 | Den et al. | 313/310 |
| 2001/0006232 A1 | 7/2001 | Choi et al. | |
| 2002/0009637 A1 | 1/2002 | Murakami et al. | 429/213 |
| 2002/0031972 A1 | 3/2002 | Kitamura et al. | 445/3 |
| 2002/0047513 A1 | 4/2002 | Nomura | 313/495 |
| 2002/0047562 A1 | 4/2002 | Kitamura et al. | 315/169.3 |
| 2002/0057045 A1 | 5/2002 | Tsukamoto | 313/309 |
| 2002/0060516 A1 | 5/2002 | Kawate et al. | 313/495 |
| 2002/0136896 A1 | 9/2002 | Takikawa et al. | 428/408 |
| 2002/0146958 A1 | 10/2002 | Ono et al. | 445/24 |
| 2003/0006684 A1 | 1/2003 | Kawate et al. | 313/311 |
| 2003/0048055 A1 | 3/2003 | Ishikura et al. | 313/311 |
| 2003/0048056 A1 | 3/2003 | Kitamura et al. | 313/311 |
| 2003/0048057 A1 | 3/2003 | Kazunari et al. | 313/311 |
| 2003/0057860 A1 | 3/2003 | Tsukamoto | 315/169.3 |
| 2003/0222560 A1 | 12/2003 | Roach | 313/311 |

FOREIGN PATENT DOCUMENTS

| | | |
|---|---|---|
| CN | 1465086 A | 12/2003 |
| EP | 0 290 026 | 11/1988 |
| EP | 0 394 698 A2 | 10/1990 |
| EP | 0 433 507 A1 | 6/1991 |
| EP | A1 443 865 | 8/1991 |
| EP | 0 535 953 A2 | 4/1993 |
| EP | A2 535 953 | 4/1993 |
| EP | 0 614 209 A1 | 9/1994 |
| EP | 0 535 953 B1 | 1/1996 |
| EP | 0 716 439 | 6/1996 |
| EP | 0 758 028 A2 | 2/1997 |
| EP | 0 797 233 A2 | 9/1997 |
| EP | 0 836 217 A1 | 4/1998 |
| EP | A1 871 195 | 10/1998 |
| EP | 0 913 508 A3 | 5/1999 |
| EP | A0 913 508 | 5/1999 |
| EP | A1 936 650 | 8/1999 |
| EP | 0 980 089 A1 | 2/2000 |
| EP | 0 451 208 B1 | 3/2000 |
| EP | 0 989 084 A2 | 3/2000 |
| EP | 1 022 763 A1 | 7/2000 |
| EP | 1 096 533 A1 | 5/2001 |
| EP | 1 102 299 A1 | 5/2001 |
| EP | 1 113 478 A1 | 7/2001 |
| EP | 1 117 118 A1 | 7/2001 |
| EP | 0 936 650 A1 | 8/2001 |
| EP | 1 120 877 A1 | 8/2001 |
| EP | 1 122 344 A2 | 8/2001 |
| EP | 1 122 344 A3 | 8/2001 |
| EP | 1 113 478 A1 | 7/2002 |
| EP | 0 758 028 B1 | 9/2002 |
| GB | 2 308 495 A | 6/1997 |
| JP | WO 89/07163 | 8/1989 |
| JP | 1-309242 | 12/1989 |
| JP | 2-112125 | 4/1990 |
| JP | 3-20941 | 1/1991 |
| JP | 03-260119 | 11/1991 |
| JP | 03-295131 | 12/1991 |
| JP | 04-212236 | 3/1992 |
| JP | 05-159696 | 6/1993 |
| JP | 05-198253 | 8/1993 |
| JP | 5-211029 | 8/1993 |
| JP | 05-274997 | 10/1993 |
| JP | 7-6714 | 1/1995 |
| JP | 8-115652 | 5/1996 |
| JP | 08-115652 | 5/1996 |
| JP | 8-264109 | 10/1996 |
| JP | 08-298068 | 11/1996 |
| JP | 9-82214 | 3/1997 |
| JP | 09-188600 | 7/1997 |
| JP | 09-237565 | 9/1997 |
| JP | 10-149760 | 6/1998 |
| JP | 10-289650 | 10/1998 |
| JP | 11-139815 | 5/1999 |
| JP | 11-162334 | 6/1999 |
| JP | 11-194134 | 7/1999 |
| JP | 11-232997 | 8/1999 |
| JP | 2000-57934 | 2/2000 |
| JP | 2000-86216 | 3/2000 |
| JP | 2000-90809 | 3/2000 |
| JP | 2000-95509 | 4/2000 |
| JP | 2000/277003 | 6/2000 |
| JP | 2000-191302 | 7/2000 |
| JP | 2000-207983 | 7/2000 |
| JP | 2000-208028 | 7/2000 |
| JP | 2000-223005 | 8/2000 |
| JP | 2000-277003 | 10/2000 |
| JP | 2001-052598 | 2/2001 |
| JP | 2001-52598 | 2/2001 |
| JP | 2001-162600 | 6/2001 |
| JP | 2001-288625 A | 10/2001 |
| JP | 2002-500415 | 1/2002 |
| WO | WO 90/07023 | 6/1990 |
| WO | WO 98/05920 | 2/1998 |

| WO | WO 99/58748 | 11/1999 |
| WO | WO 01/26130 | 4/2001 |
| WO | WO 01/93292 | 12/2001 |

OTHER PUBLICATIONS

R.T.K. Baker et al., "Formation of Carbonaceous Deposits from the Platinum-Iron Catalyzed Decomposition of Acyetylene," 37 J. Catal. 101-105 (1975).

R.T.K. Baker, "Catalytic Growth of Carbon Filaments," 27 (3) Carbon 315-323 (1989).

S. Iijima, "Helical Microtubules of Graphitic Carbon," Nature, vol. 345, 56-58 (1991).

T. W. Ebbesen et al., "Large-Scale Synthesis of Carbon Nanotubes," Nature, vol. 358, 220-222 (1992).

W. A. DeHeer et al., "Alligned Carbon Nanotube Films: Production and Optical and Electronic Properties," Science vol. 268, 845-847 (1995).

T. Guo et al., "Catalytic Growth of Single- Walled Nanotubes by Laser Vaporization," Chem Phys. Lett., vol. 243, 49-54 (1995).

A. G. Rinzler et al., "Unraveling Nanotubes: Field Emission from an Atomic Wire," Science, vol. 269, 1550-1553 (1995).

W. A. DeHeer et al., "A Carbon Nanotube Field-Emission Electron Source," Science, vol. 270, 1179-1180 (1995).

T. Kyotani et al., "Preparation of Ultrafine Carbon Tubes in Nanochannels of an Anodic Aluminum Oxide Film," Chem. Mater., vol. 8, 2109-2113 (1996).

A. Thess et al., "Crystalline Ropes of Metallic Carbon Nanotubes," Science, vol. 273 483-487 (1996).

H. Dai et al., "Single-Wall Nanotubes Produced by Metal-Catalyzed Disproportionation of Carbon Monoxide," Chem. Phys. Lett., vol. 260, 471-475 (1996).

A. C. Dillon et al., "Storage of Hydrogen in Single- Walled Carbon Nanotubes," Nature, vol. 386, 377-379 (1997).

W.P. Dyke et al., "Field Emission", *Advances in Electronics and Electron Physics*, vol. 8, (1956) pp. 89-185.

C.A. Spindt et al., "Physical Properties of Thin-Film Field Emission Cathodes with Molybdenum Cones", *Journal of Applied Physics*, vol. 47, No. 12 (1976), pp. 5248-5263.

C.A. Mead, "Operation of Tunnel-Emission Devices", *Journal of Applied Physics*, vol. 32, No. 4, (1961), pp. 646-652.

Toshiaki Kusunoki et al., "Fluctuation-Free Electron Emission from Non-Formed Metal-Insulator-Metal (MIM) Cathodes Fabricated by Low Current Anodic Oxidation", *Japanese Journal of Applied Physics*, vol. 32, No. 11B, (1993), p. L1695-1697.

M.I. Elinson et al., "The Emission of Hot Electrons and the Field Emission of Electrons from Tin Oxide", *Radio Engineering and Electronic Physics*, (1965) pp. 1290-1296.

G. Dittmer, "Electrical Conduction and Electron Emission of Discontinuous Thin Film", *Thin Solid Films*, vol. 9, (1972) pp. 317-329.

M. Hartwell et al., "Strong Electron Emission from Patterned Tin-Indium Oxide Thin Films", IEEE Trans. Ed. Conf., (1983) pp. 519-521.

Hisashi Araki et al., Electroforming and Electron Emission of Carbon Thin Films, Journal of the Vacuum Society of Japan, 1983 (with English Abstract on p. 22).

Rodriguez et al., "Catalytic Engineering of Carbon Nanostructures," Langmuir 11, 3862-3866 (1995).

W. Zhu et al., *Electron Field Emission From Nanostructured Diamond and Carbon Nanotubes*, Solid State Electronics, vol. 45, 2001, pp. 921-928.

J.M. Bonard et al., *Field Emission from Carbon Nanotubes: The First Five Years*, Solid State Electronics, vol. 45, 2001, pp. 893-914.

A.M. Rao et al., "In Situ-grown Carbon Nanotube Array of with Excellent Field Emission Characteristics," Applied Physics Letter, vol. 76, No. 25, pp. 3813-3815 (2000).

Cheol Jin Lee et al., "Carbon Nanofibers Grown on Sodalime Glass at 500 °C Using Thermal Chemical Vapor Deposition," Chemical Physics Letters 340, pp. 413-418 (2001).

Sashiro Uemura et al., "Carbon Nanotube FED with Graphite-Nano-Fiber Emitters," ISSN 1083-1312, pp. 398-401.

Q. H. Wang et al., "A Nanotube-based Field-Emission Flat Panel Display," Applied Physics Letters, vol. 72, No. 22, Jun. 1998, pp. 2912-2913.

H. Dai et al., "Nanotubes as Nanoprobes in Scanning Probe Microscopy," Nature, vol. 384, 147-150 (1996).

Xucun Ma et al., Polymerized carbon nanobells and their field-emission properties, Applied Physics Letters, Nov. 15, 1999, vol. 75, No. 20, pp. 3105-3107.

* cited by examiner

200
ELECTRON-EMITTING DEVICE, ELECTRON-EMITTING APPARATUS, IMAGE DISPLAY APPARATUS, AND LIGHT-EMITTING APPARATUS

This application is a division of U.S. application Ser. No. 09/941,780, filed Aug. 30, 2001.

BACKGROUND OF THE INVENTION

1. Field of the Invention

The present invention relates to an electron-emitting device, an electron-emitting apparatus, an electron source and an image-forming apparatus. The present invention also relates to a display apparatus such as a television broadcast display, a display for use in a video conference system or a computer display, and to an image-forming apparatus designed as an optical printer using a photosensitive drum or the like.

2. Related Background Art

A field emission (FE) type of electron-emitting device which emits electrons from a surface of a metal when a strong electric field of $10^6$ V/cm or higher is applied to the metal, and which is one of the known cold cathode electron sources, is attracting attention.

If the FE-type cold electron source is put to practical use, a thin emissive type image display apparatus can be realized. The FE-type cold electron source also contributes to reductions in power consumption and weight of an image display apparatus.

FIG. 13 shows a vertical FE-type cold electron source structure formed of a substrate 131, an emitter electrode 132, an insulating layer 133, an emitter 135, and an anode 136. The shape of an electron beam with which the anode is irradiated is indicated by 137. This structure is of a Spindt type such that an opening is formed in the insulating layer 133 and the gate electrode 134 provided on the cathode 132, and the emitter 135 having a conical shape is placed in the opening. (This type of structure is disclosed by, for example, C. A. Spindt, "Physical Properties of thin-film field emission cathodes with molybdenum cones", J. Appl. Phys., 47, 5248 (1976).)

FIG. 14 shows a lateral FE structure formed of a substrate 141, an emitter electrode 142, an insulating layer 143, an emitter 145, and an anode 146. The shape of an electron beam with which the anode is irradiated is indicated by 147. The emitter 145 having an acute extreme end and the gate electrode 144 for drawing out electrons from the extreme end of the emitter are disposed above and parallel to the substrate, and the collector (anode) is formed above the gate electrode and the emitter electrode remote from the substrate (see U.S. Pat. Nos. 4,728,851, 4,904,895, etc.).

Also, Japanese Patent Application Laid-open No. 8-115652 discloses an electron-emitting device using fibrous carbon which is deposited in a narrow gap by performing thermal cracking of an organic chemical compound gas on a catalyst metal.

In an image display apparatus using one of the above-described FE-type electron sources, an electron beam spot is obtained which has a size (hereinafter referred to as "beam diameter") depending on the distance H between the electron source and the phosphor, the anode voltage Va, and the device drive voltage Vf. The beam diameter is smaller than a millimeter and the image display apparatus has sufficiently high resolution.

In recent years, however, there has been a tendency to require higher resolution of image display apparatuses.

Further, with the increase in the number of display pixels, power consumption during driving due to the device capacitance of electron-emitting devices is increased. Therefore there is a need to reduce the device capacitance and the drive voltage and to improve the efficiency of electron-emitting devices.

In the above-described Spindt type of electron source, the gate is laminated on the substrate with the insulating layer interposed therebetween, so that parasitic capacitances are produced between large capacitances and a multiplicity of emitters. Moreover, the drive voltage is high, several ten to several hundred volts, and capacitive power consumption is disadvantageously large because of the specific structure.

Also, since the beam of electrons drawn out spreads out, there is a need for a focusing electrode for limiting spreading of the beam. For example, Japanese Patent Application Laid-open No. 7-6714 discloses a method of converging electron trajectories by disposing an electrode for focusing electrons. This method, however, has the problem of an increase in complexity of the manufacturing process, a reduction in electron emission efficiency, etc., due to the addition of the focusing electrode.

In ordinary lateral FE electron sources, electrons emitted from the cathode are liable to impinge on the opposed gate electrode. Therefore the structure of lateral FE electron sources has the problem of a reduction in the efficiency (the ratio of the electron current flowing through the gate and the electron current reaching the anode) and considerable spreading of the beam shape on the anode.

SUMMARY OF THE INVENTION

In view of the above-described problems, an object of the present invention is to provide an electron-emitting device in which the specific capacitance is reduced, which has a lower drive voltage, and which is capable of obtaining a finer electron beam by controlling the trajectory of emitted electrons.

To achieve the above-described object, according to one aspect of the present invention, there is provided an electron-emitting apparatus comprising:

a first electrode and a second electrode disposed on a surface of a substrate;

first voltage application means for applying to the second electrode a potential higher than a potential applied to the first electrode;

an electron-emitting member disposed on the first electrode;

a third electrode disposed so as to face the substrate, electrons emitted from the electron-emitting member reaching the third electrode; and second voltage application means for applying to the third electrode a potential higher than each of the potentials applied to the first and second electrodes, wherein a surface of the electron-emitting member is placed between a plane containing a surface of the second electrode and substantially parallel to the surface of the substrate and a plane containing a surface of the third electrode and substantially parallel to the surface of the substrate. When the distance between the second electrode and the first electrode is d; the potential difference applied between the second electrode and the first electrode by the first voltage application means is V1; the distance between the third electrode and the substrate is H; and the potential difference between the potential applied to the third electrode by the second voltage application means and the potential applied to the first electrode by the first voltage application means is V2, then an electric field $E1=V1/d$ is within the range from 1 to 50 times an electric field $E2=V2/H$.

According to another aspect of the present invention, there is provided an electron-emitting apparatus comprising:

a first electrode and a second electrode disposed on a surface of a substrate;

first voltage application means for applying to the second electrode a potential higher than a potential applied to the first electrode;

a plurality of fibers disposed on the first electrode, the fibers containing carbon as a main ingredient;

a third electrode disposed so as to face the substrate, electrons emitted from the fibers reaching the third electrode; and second voltage application means for applying to the third electrode a potential higher than each of the potentials applied to the first and second electrodes, wherein a surface region of the fibers is placed between a plane containing a surface of the second electrode and substantially parallel to the surface of the substrate and a plane containing a surface of the third electrode and substantially parallel to the surface of the substrate.

In the above-described arrangement, the place at which the electric field concentrates is limited to one side of the region where an emitter material is formed, thereby enabling emitted electrons to be first drawn out toward the extraction electrode (gate electrode) and then made to reach the anode with substantially no possibility of impinging on the extraction electrode. As a result, the electron emission efficiency is improved. Also, there is substantially no possibility of scattering of electrons on the extraction electrode, so that the size of the beam spot obtained on the anode is smaller than that in the conventional device having the problem of scattering on the extraction electrode.

According to still another aspect of the present invention, there is provided an electron-emitting device comprising:

a fiber containing carbon as a main ingredient; and an electrode for controlling emission of electrodes from the fiber containing carbon as a main ingredient, wherein the fiber containing carbon as a main ingredient has a plurality of layered (laminated) graphenes so as not to be parallel to the axis direction of the fiber.

According to a further aspect of the present invention, there is provided an electron-emitting device comprising:

a first electrode and a second electrode disposed on a surface of a substrate, a gap being formed between the first and second electrodes; and a fiber provided on the first electrode, the fiber containing carbon as a main ingredient, wherein the second electrode comprises an electrode for controlling emission of electrons from the fiber containing carbon as a main ingredient, and wherein the fiber containing carbon as a main ingredient comprises graphene.

The electron-emitting device of the present invention can stably emit electrons in a low vacuum degree at an increased rate for a long time period.

According to the present invention, a light-emitting member is provided on the anode in the electron-emitting apparatus or above the electron-emitting device to form a light-emitting device, an image display apparatus or the like capable of operating in a low vacuum degree and effecting high-luminance emission/display for a long time period with stability.

DETAILED DESCRIPTION OF THE PREFERRED EMBODIMENTS

Preferred embodiments of the present invention will be described in detail with reference to the accompanying drawings. The description of components of the embodiments made below with respect to the size, material and shape of the components and the relative positions of the components is not intended to limit the scope of the present invention except for particular mention of specified details.

The operating voltage Vf of FE devices is generally determined by the electric field at an extreme end of an emitter obtained from the Poisson equation and by the current density of electron emission current according to the relational expression called "Fowler-Nordheim equation" with a work function of the electric field and the emitter portion used as a parameter.

A stronger electric field is obtained as the electric field necessary for emission of electrons as the distance D between the emitter extreme end and the gate electrode is smaller or the radius r of the emitter extreme end is smaller.

Figure 13:
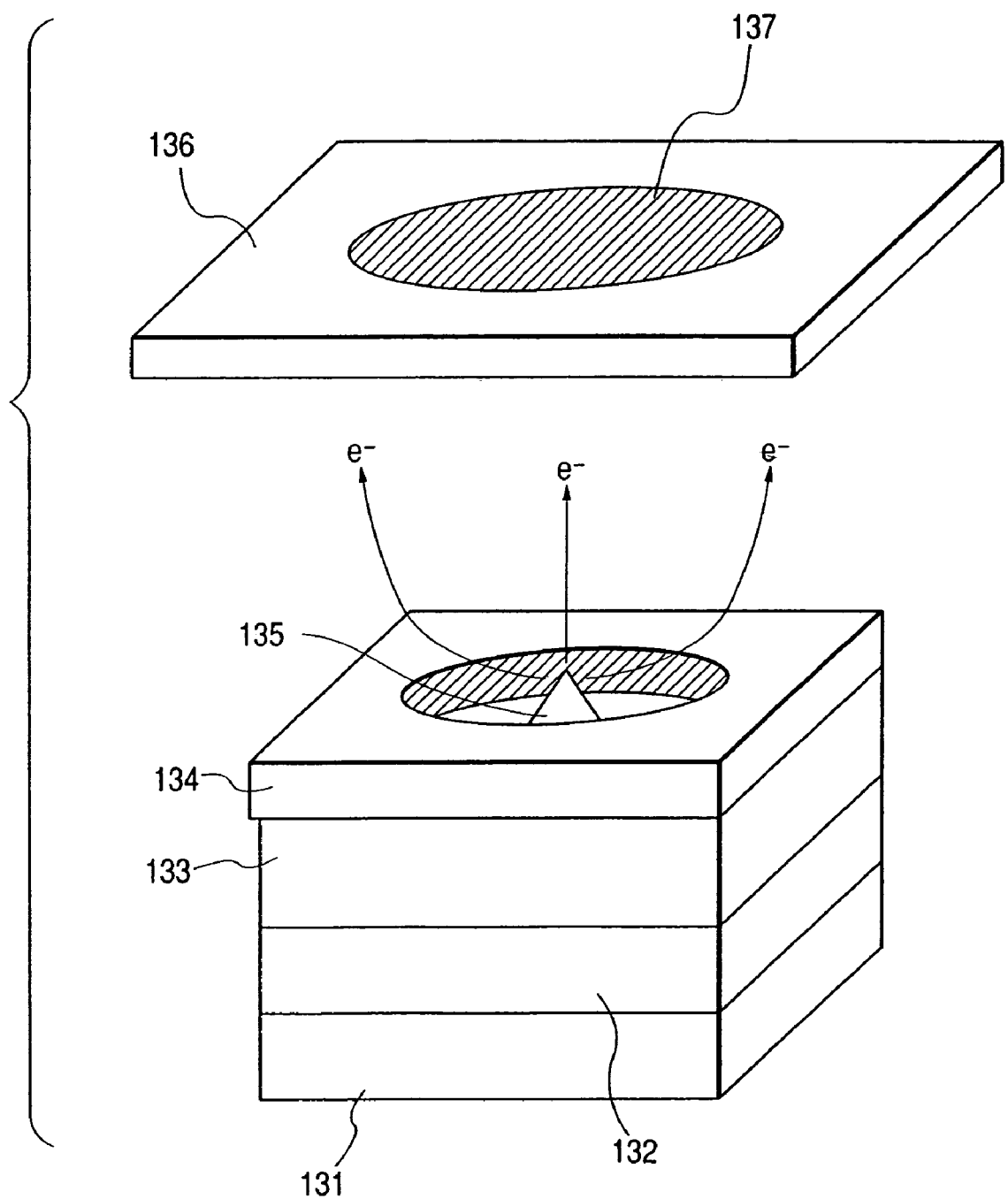
FIG. 13 is a diagram showing a conventional vertical FE structure.

On the other hand, the maximum size Xd in the X-direction of the electron beam obtained on the anode (e.g., the maximum reach from the center of the circular beam shape 137 shown in FIG. 13) is expressed in such a form as to be proportional to (Vf/Va) in simple calculation.

As is apparent from this relationship, an increase in Vf results in an increase in beam diameter.

Consequently, there is a need to minimize the distance D and the radius of curvature r in order to reduce Vf.

Figure 14:
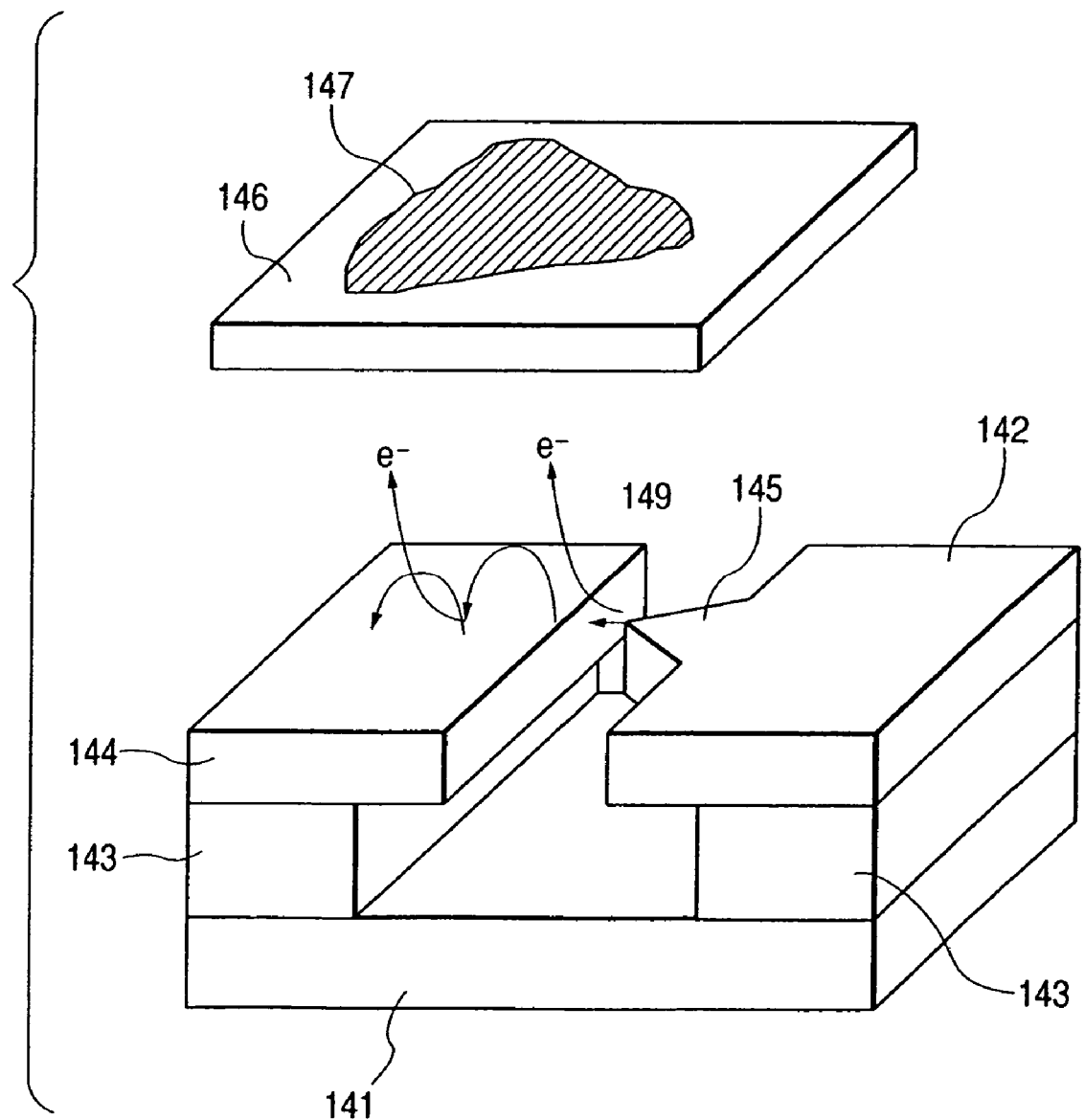
FIG. 14 is a diagram showing an example of a conventional lateral FE structure.

Beam shapes in conventional arrangements will be described with reference to FIGS. 13 and 14. In FIGS. 13 and 14, substrates which are corresponding components of the two arrangements are indicated by 131 and 141; emitter electrodes by 132 and 142; insulating layers by 133 and 143; emitters by 135 and 145; anodes by 136 and 146; the shapes of electron beams with which the anodes are irradiated by 137 and 147.

In the case of the Spindt type described above with reference to FIG. 13, when Vf is applied between the emitter 135 and the gate 134, the strength of the electric field at the extreme end of the projection of the emitter 135 is increased and electrons are thereby taken out of a conical emitter portion about the extreme end into the vacuum.

The electric field at the extreme end of the emitter is formed based on the shape of the extreme end of the emitter to have a certain finite area on the same, so that electrons are perpendicularly drawn out from the finite emitter extreme end area according to the potential.

Simultaneously, other electrons are emitted at various angles. Electrons emitted at larger angles are necessarily drawn toward the gate.

As a result, if the gate is formed so as to have a circular opening, the distribution of electrons on the anode 136 shown in FIG. 13 forms a substantially circular beam shape 137. That is, the shape of the beam obtained is closely related to the shape of the drawing gate and to the distance between the gate and the emitter.

In the case of the lateral FE electron source (FIG. 14) in which electrons are drawn out generally along one direction, an extremely strong electric field substantially parallel to the surface of the substrate 141 (lateral electric field) is produced between the emitter 145 and the gate 144, so-that part 149 of electrons emitted from the emitter 145 are drawn into the vacuum above the gate 144 while the other electrons are taken into the gate electrode 144.

In the arrangement shown in FIG. 14, electric field vectors toward the anode 146 differ in direction from those causing emission of electrons (the electric field from the emitter 145 toward the gate 144). Therefore the distribution of electrons (beam spot) formed by emitted electrons on the anode 146 is increased.

The electric field of electrons drawn out from the emitter electrode 145 (referred to as "lateral electric field" in the following description for convenience sake while the electric field strengthening effect of the emitter configuration is ignored) and the electric field toward the anode (referred to as "vertical electric field" in the following description) will further be described.

The "lateral electric field" can also be expressed as "electric field in a direction substantially parallel to the surface of substrate 131 (141)" in the arrangement shown in FIG. 13 or 14. It can also be expressed as "electric field in the direction of opposition of gate 144 and emitter 145" with respect to the arrangement shown in FIG. 14 in particular.

Also, the "vertical electric field" can also be expressed as "electric field in a direction substantially perpendicular to the surface of substrate 131 (141)" in the arrangement shown in FIG. 13 or 14, or as "electric field in the direction in which the substrate 131 (141) is opposed to the anode 136 (146)".

In the arrangement shown in FIG. 14, as described above, electrons emitted from the emitter are first drawn out by the lateral electric field, fly toward the gate, and are then moved upward by the vertical electric field to reach the anode.

Important factors of this effect are the ratio of the strengths of the lateral and vertical electric fields and the relative position of the electron emission point.

When the lateral electric field is stronger than the vertical electric field by an order of magnitude, the trajectories of almost all of electrons drawn out from the emitter are gradually bent by radial potential produced by the lateral electric field so that the electrons fly toward the gate. A part of the electrons impinging on the gate ejects again in a scattering manner. After ejection, however, the electrons repeat scattering while spreading out along the gate by forming elliptical trajectories again and again and while being reduced in number when ejecting until they are caught by the vertical electric field. Only after the scattered electrons have exceeded an equipotential line formed by the gate potential (which line may be called "stagnation point"), they are moved upward by the vertical electric field.

When the lateral electric field and the vertical electric field are approximately equal in strength, the restraint imposed by the lateral electric field on electrons drawn out is reduced, although the trajectories of the electrons are bent by the radial potential. In this case, therefore, electron trajectories appear along which electrons travel to be caught by the vertical electric field without impinging on the gate.

It has been found that if the electron emission position at which electrons are emitted from the emitter is shifted from the gate plane toward the anode plane (see FIG. 6), emitted electrons can form trajectories such as to be caught by the vertical electric field with substantially no possibility of impinging on the gate when the lateral electric field and the vertical electric field are approximately equal in strength, that is, the ratio of the strength of the lateral electric field to that of the vertical electric field is approximately 1 to 1.

Also, a study made of the electric field ratio has shown that if the distance between the gate electrode 144 and the extreme end of the emitter electrode 145 is d; the potential difference (between the gate electrode and the emitter electrode) when the device is driven is V1; the distance between the anode and the substrate (element) is H; and the potential difference between the anode and the cathode (emitter electrode) is V2, a trajectory along which electrons drawn out impinge on the gate is formed when the lateral electric field $E1=V1/d$ is 50 times or more stronger than the vertical electric field $E2=V2/H$.

The inventor of the present invention has also found that a height s (defined as the distance between a plane containing a portion of a gate electrode 2 surface and substantially parallel to a substrate 1 surface and a plane containing an electron-emitting member 4 surface and substantially parallel to the substrate 1 surface (see FIG. 6)) can be determined such that substantially no scattering occurs on the gate electrode 2. The height s depends on the ratio of the vertical electric field and the lateral electric field (vertical electric field strength/lateral electric field strength). As the vertical-lateral electric field ratio is lower, the height s is lower. AS the lateral electric field is stronger, the necessary height s is higher.

The height set in a practical manufacturing process ranges from 10 nm to 10 μm.

In the conventional arrangement shown in FIG. 14, the gate 144 and the emitter (142, 145) are formed flush with each other along a common plane and the lateral electric field is stronger than the vertical electric field by an order of magnitude, so that there is a considerable tendency to reduce, by impingement on the gate, the amount of electrons drawn out into the vacuum.

Further, in the conventional arrangement, the structure of the device is determined so as to increase the strength of the electric field in the lateral direction, so that the electron distribution on the anode 146 spreads widely.

As described above, to restrict the distribution of electrons reaching the anode 146, it is necessary (1) to reduce the drive voltage (Vf), (2) to unidirectionally draw out electrons, (3) to consider the trajectory of electrons and, if scattering on the gate occurs, (4) to consider the electron scattering mechanism (elastic scattering in particular).

Therefore the present invention aims to provide an electron-emitting device in which the distribution of electrons with which the anode surface is irradiated is made finer, and in which the electron emission efficiency is improved (the amount of emitted electrons absorbed in the gate electrode is reduced).

The structure of a novel electron-emitting device in accordance with the present invention will now be described below in detail.

Figure 1A:
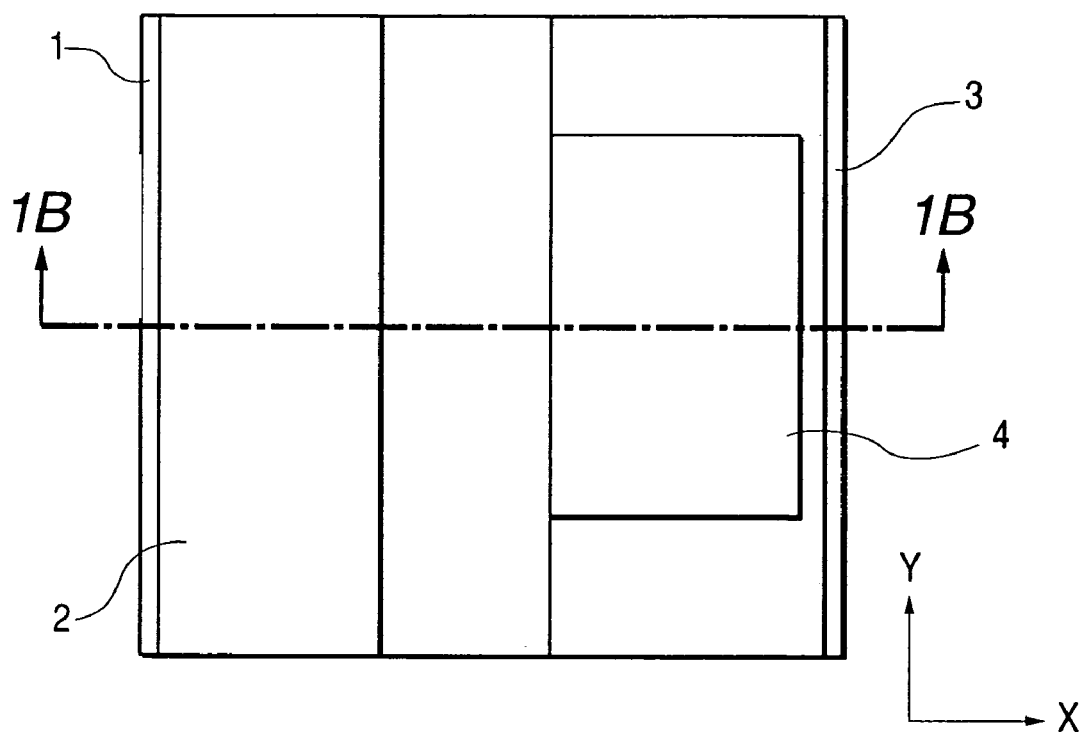
FIGS. 1A and 1B are diagrams showing an example of a basic electron-emitting device in accordance with the present invention.
Figure 1B:
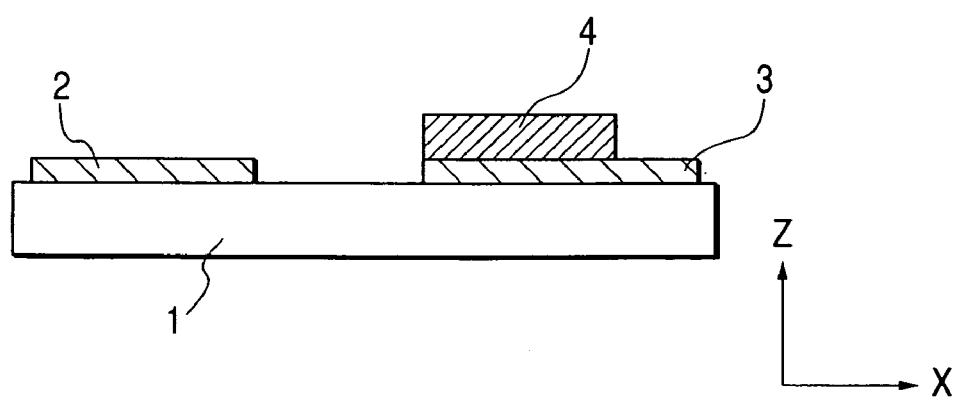
Figure 6:
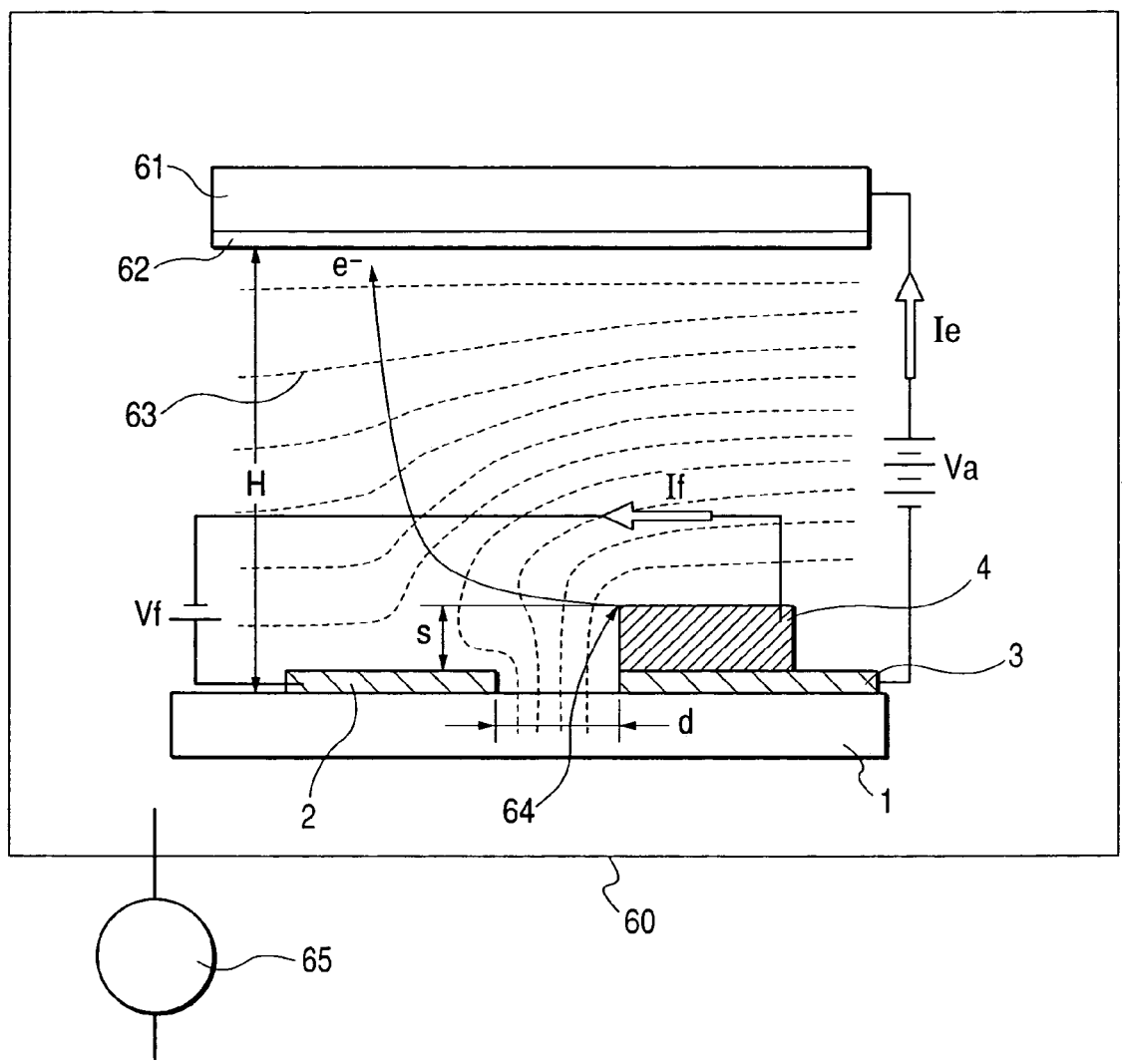
FIG. 6 is a diagram showing an arrangement for operating the electron-emitting device of the present invention.

FIG. 1A is a schematic plan view showing an example of an electron-emitting device in accordance with the present invention. FIG. 1B is a cross-sectional view taken along the line 1B—1B of FIG. 1A. FIG. 6 is schematic cross-sectional view of the electron-emitting apparatus of the present invention in a state where the electron-emitting apparatus having an anode disposed above the electron-emitting device of the present invention is being driven.

In FIGS. 1A, 1B and 6 are illustrated an insulating substrate 1, an extraction electrode 2 (also referred to as "gate electrode" or "second electrode"), a cathode 3 (also referred to as "first electrode"), an electron-emitting material 4 provided on the cathode 3 (also referred to as "electron-emitting member" or "emitter material"), and an anode 61 (also referred to as "third electrode").

In the electron-emitting apparatus of the present invention, if as shown in FIGS. 1A, 1B and 6 the distance by which the cathode 3 and the gate electrode 2 are spaced apart from each other is d; the potential difference (the voltage between the cathode 3 and the gate electrode 2) when the electron-emitting device is driven is Vf; the distance between the anode 61 and the surface of the substrate 1 on which the electron-emitting device is arranged is H; and the potential difference between the anode 61 and the cathode 3 is Va, an electric field produced to drive the device (lateral electric field): E1=Vf/d is set within the range from 1 to 50 times an electric field between the anode and the cathode (vertical electric field): E2=Va/H.

The proportion of electrons impinging on the gate electrode 2 in electrons emitted from the cathode 3 is reduced thereby. In this manner, a high-efficiency electron-emitting device capable of preventing an emitted electron beam from spreading out widely can be obtained.

The "lateral electric field" referred to in the description of the present invention can also be expressed as "electric field in a direction substantially parallel to the surface of substrate 1". It can also be expressed as "electric field in the direction in which the gate 2 is opposed to the cathode 3".

Also, the "vertical electric field" referred to in the description of the present invention can also be expressed as "electric field in a direction substantially perpendicular to the surface of substrate 1". It can also be expressed as "electric field in the direction in which the substrate 1 is opposed to the anode 61".

Further, in the electron-emitting apparatus of the present invention, a plane containing the surface of the electron-emitting member 4 and substantially parallel to the surface of the substrate 1 is spaced apart from a plane containing a portion of the surface of the gate electrode 2 and substantially parallel to the surface of the substrate 1 (see FIG. 6). In other words, in the electron-emitting apparatus of the present invention, a plane containing the surface of the electron-emitting member 4 and substantially parallel to the surface of the substrate 1 is placed between the anode 61 and a plane containing a portion of the surface of the gate electrode 2 and substantially parallel to the substrate surface (see FIG. 6).

Further, in the electron-emitting device of the present invention, the electron-emitting member 4 is placed at a height s (defined as the distance between the plane containing a portion of the surface of gate electrode 2 and substantially parallel to the surface of substrate 1 and the plane containing the surface of electron-emitting member 4 and substantially parallel to the surface of substrate 1 (see FIG. 6)) such that substantially no scattering occurs on the gate electrode 2.

The height s depends on the ratio of the vertical electric field and the lateral electric field (vertical electric field strength/lateral electric field strength). As the vertical-lateral electric field ratio is lower, the height s is lower. As the lateral electric field is stronger, the necessary height s is higher. Practically, the height is not less than 10 nm not more than 10 μm.

Examples of the insulating substrate 1 are the following substrates whose surfaces are sufficiently cleansed: quartz glass; glass in which the content of an impurity such as Na is reduced by partial substitution by K, for example; a laminate formed in such a manner that $SiO_2$ is laminated by sputtering or the like on soda lime glass, a silicon substrate or the like; and an insulating substrate made of a ceramic such as alumina.

Each of the extraction electrode 2 and cathode 3 is an electrically conductive member formed on the surface of the substrate 1 by an ordinary vacuum film forming technique, such as evaporation or sputtering, or a photolithography technique so as to face each other. The material of the electrodes 2 and 3 is selected from, for example, carbon, metals, nitrides of metals, carbides of metals, borides of metals, semiconductors, and metallic compounds of semiconductors. The thickness of the electrodes 2 and 3 is set within the range from several ten nanometers to several ten microns. Preferably, the material of the electrodes 2 and 3 is a heat resistant material formed of carbon, a metal, a nitride of a metal or a carbide of a metal.

The material of the electrodes 2 and 3 constituting the electron-emitting device in accordance with the present invention are disposed on the surface of the substrate 1. Needless to say, the extraction electrode 2 and the cathode 3 are spaced apart from each other along a direction substantially parallel to the plane containing the surface of the substrate 1. In other words, the electron-emitting device is constructed so that the extraction electrode 2 and the cathode 3 do not overlap each other.

In particular, in the case of growth of fibrous carbon described below, the electrodes are preferably formed of silicon having conductivity, e.g., doped polysilicon or the like.

If there is apprehension about, for example, a voltage drop due to the small thickness of the electrodes, or if a plurality of the electron-emitting devices are used in matrix form, a low-resistance wiring metallic material may be used to form suitable wiring portions on condition that it does not affect emission of electrons.

The emitter material (electron-emitting member) 4 may be formed in such a manner that a film deposited by an ordinary vacuum film forming method such as sputtering is worked into the shape of the emitter by using a technique such as reactive ion etching (RIE). Alternatively, it may be formed by growing needle crystals or whiskers by seed growth in chemical vapor deposition (CVD). In the case of RIE, the control of the emitter shape depends on the kind of the substrate used, the kind of gas, the gas pressure (flow rate), the etching time, the energy for forming plasma, etc. In a CVD forming process, the emitter shape is controlled by selecting the kind of the substrate, the kind of gas, the flow rate, the growth temperature, etc.

Examples of the material used to form the emitter (electron-emitting member) 4 are carbides, such as TiC, ZrC, HfC, TaC, SiC, and WC, amorphous carbon, graphite, diamondlike carbon, carbon containing dispersed diamond, and carbon compounds.

According to the present invention, fibrous carbon is particularly preferably used as the material of the emitter (electron-emitting member) 4. "Fibrous carbon" referred to in the description of the present invention can also be expressed as "material in columnar form containing carbon as a main constituent" or "material in filament form containing carbon as a main constituent". Further, "fibrous carbon" can also be expressed as "fibers containing carbon as a main constituent". More specifically, "fibrous carbon" in accordance with the present invention comprises carbon nanotubes, graphite nanofibers, and amorphous carbon fibers. In particular, graphite nanofibers are most preferred as electron-emitting member 4.

The gap between the extraction electrode 2 and the cathode 3 and the drive voltage (the voltage applied between the extraction electrode 2 and the cathode 3) may be determined so that the value of the lateral electric field necessary for emission of electrons from the cathode material used is 1 to 50 times larger than that of the vertical electric field necessary for forming an image, as described above.

In a case where a light-emitting member such as a phosphor is provided on the anode, the necessary vertical electric field is, preferably, within the $10^{-1}$ to $10$ V/μm range. For example, in a case where the gap between the anode and the cathode is 2 mm and 10 kV is applied between the anode and the cathode, the vertical electric field is 5 V/μm. In this case, the emitter material (electron-emitting member) 4 to be used has an electron-emitting electric field value of 5 V/μm or higher. The gap and the drive voltage may be determined in correspondence with the selected electron-emitting electric field value.

Figure 11:
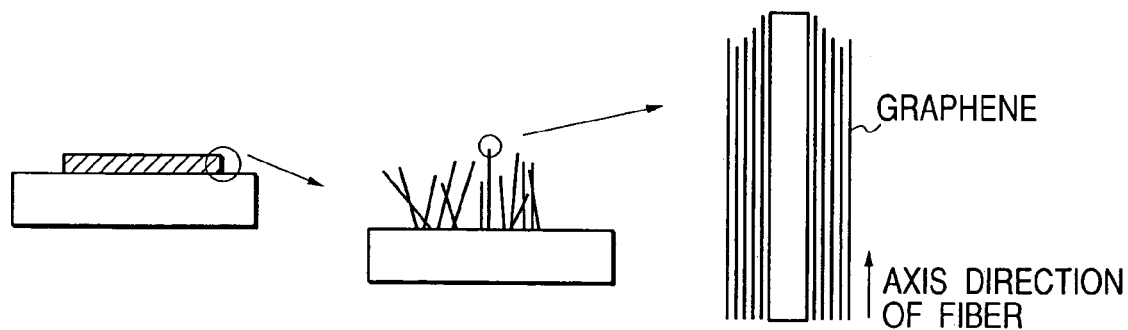
FIG. 11 is a diagram schematically showing the structure of a carbon nanotube.
Figure 12:
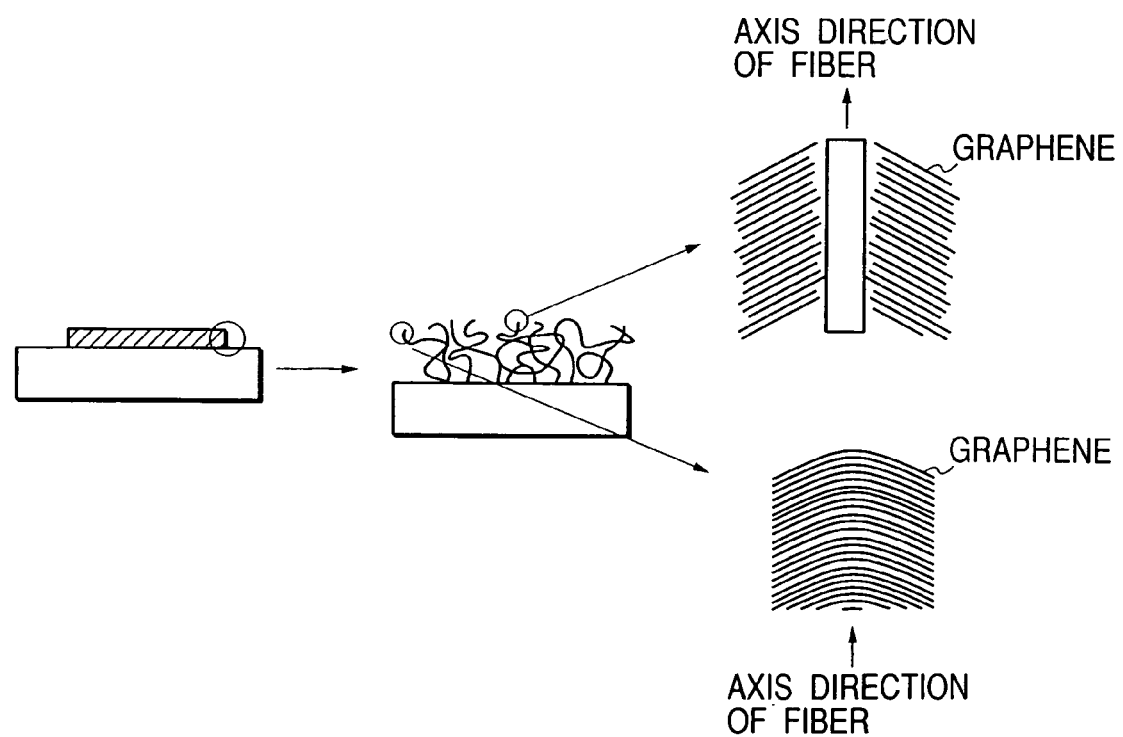
FIG. 12 is a diagram schematically showing the structure of a graphite nanofiber.

An example of a material having an electric field threshold of several V/μm is fibrous carbon. Each of FIGS. 11 and 12 shows an example of the configuration of fibrous carbon. In each of FIGS. 11 and 12, the configuration is schematically shown at the optical microscope level (to 1,000 times) in the left-hand section, at the scanning electron microscope level (to 30,000 times) in the middle section, and at the transmission electron microscope level (to 1,000,000 times) in the right-hand section.

A graphene structure formed into a cylinder such as that shown in FIG. 11 is called a carbon nanotube (a multilayer cylindrical graphene structure is called a multiwall nanotube). Its threshold value is minimized when the tube end is opened.

The fibrous carbon shown in FIG. 12 may be produced at a comparatively low temperature. Fibrous carbon having such a configuration is composed of a graphene layered body (thus, it may be referred to as "graphite nanofiber", and has an amorphous structure whose ratio is increased with temperature). More specifically, "graphite nanofiber" designates a fibrous substance in which graphenes are layered (laminated) in the longitudinal direction thereof (in the axis direction of the fiber). In other words, graphite nanofiber is a fibrous substance in which a plurality of graphenes are arranged and layered (laminated) so as not to be parallel to the fiber axis, as shown in FIG. 12.

On the other hand, a carbon nanotube is a fibrous substance in which graphenes are arranged (in cylindrical shape) around the longitudinal direction (fiber axis direction). In other words, it is a fibrous substance in which graphenes are arranged substantially parallel to the fiber axis.

One layer of graphite is called "graphene" or "graphene sheet". More specifically, graphite is formed in such a manner that carbon planes on which carbon atoms are arrayed so as to form regular hexagons close to each other by covalent bond in $sp^2$ hybridization are laid one on another while being spaced by a distance of 3.354Å. Each carbon plane is called "graphene" or "graphene sheet".

Each type of fibrous carbon has an electron emission threshold value of about 1 to 10 V/μm and is therefore preferred as the material of the emitter (electron-emitting member) 4 in accordance with the present invention.

In particular, electron-emitting devices using graphite nanofibers, not limited to the device structure of the present invention shown in FIG. 1, etc., are capable of causing emission of electrons in a low electric field to obtain a large emission current, and can be readily manufactured to obtain as an electron-emitting device having stable electron-emitting characteristics. For example, such an electron-emitting element can be obtained by forming graphite nanofibers as an emitter and by providing an electrode for controlling emission of electrons from the emitter. Further, if a light emitting member capable of emitting light when irradiated with electrons emitted from graphite nanofibers is used, a light emitting device such as a lamp can be formed. Further, an image display apparatus may be constructed by forming an array of a plurality of the above-described electron-emitting devices and by preparing an anode having a light emitting material such as a phosphor. In the electron-emitting device, the light emitting device or the image display apparatus using above-described graphite nanofibers, stable emission of electrons can be achieved without maintaining inside the device or the apparatus an ultrahigh vacuum such as that required in conventional electron-emitting devices. Moreover, since electrons are emitted by a low electric field, the device or apparatus can be easily manufactured with improved-reliability.

The above-described fibrous carbon can be formed by decomposing a hydrocarbon gas by using a catalyst (a material for accelerating deposition of carbon). The processes for forming carbon nanotubes and graphite nanofibers differ in the kind of catalyst and decomposition temperature.

The catalytic material may be a material which is used as a seed for forming fibrous carbon, and which is selected from Fe, Co, Pd, No, and alloys of some of these materials.

In particular, if Pd or Ni is used, graphite nanofibers can be formed at a low temperature (not lower than 400° C.). The necessary carbon nanotube forming temperature in the case of using Fe or Co is 800° C. or higher. Also, the process of producing a graphite nanofiber material by using Pd or Ni, which can be performed at a lower temperature, is preferred from the viewpoint of reducing the influence on other components and limiting the manufacturing cost.

Further, the characteristic of Pd that resides in enabling oxides to be reduced by hydrogen at a low temperature (room temperature) may be utilized. That is, palladium oxide may be used as a seed forming material.

If hydrogen reduction using palladium oxide is performed, an initial agglomeration seed can be formed at a comparatively low temperature (equal to or lower than 200°

C.) without metallic film thermal agglomeration or ultrafine particle forming/deposition conventionally used as ordinary seed forming techniques.

The above-mentioned hydrocarbon gas may be, for example, acetylene, ethylene, methane, propane, or propylene. Further, CO or $CO_2$ gas or vapor of an organic solvent such as ethanol or acetone may be used in some case.

In the device of the present invention, the region where the emitter (electron-emitting member) exists will be referred to as "emitter-region" regardless of contribution to emission of electrons.

The position of the electron emission point (electron-emitting portion) in the "emitter region" and the electron-emitting operation will be described with reference to FIGS. 6 and 7.

The electron-emitting device having the distance between the cathode 3 and the extraction electrode 2 to several microns was set in a vacuum apparatus 60 such as shown in FIG. 6. A sufficiently high degree of vacuum about $10^{-4}$ Pa was produced by a evacuating pump 65. A potential (voltage Va) higher by several kilovolts than that of the cathode 3 and the extraction electrode was applied from a voltage source ("second voltage application means" or "second potential application means") to the anode 61, which was placed so that the surface of the anode 61 is at the height H, which was several millimeters, from the surface of the substrate 1, as shown in FIG. 6. While the voltage Va was applied between the cathode 3 and the anode 61, the voltage applied to the anode may be a voltage from the ground potential. The substrate 1 and the anode 61 were positioned relative to each other so that their surfaces are parallel to each other.

Between the cathode 3 and the extraction electrode 2 of the electron-emitting device, a voltage of about several ten volts was applied as drive voltage Vf from a power supply (not shown) ("first voltage application means" or "first potential application means"). Device current If flowing between the electrodes 2 and 3 and electron emission current Ie flowing through the anode were measured.

It is supposed that, during this operation, equipotential lines 63 are formed as shown in FIG. 6 (an electric field (the direction of an electric field) substantially parallel to the surface of the substrate 1, and that the concentration of the electric field is maximized at the point on a portion of the electron-emitting member 4 closest to the anode and facing the gap, as indicated by 64. It is thought that electrons are emitted mainly from the portion of the electron-emitting material in the vicinity of this electric field concentration point, where the concentration of the electric field is maximized. An Ie characteristic such as shown in FIG. 7 was obtained. That is, Ie rises abruptly at a voltage about half the applied voltage. The If characteristic (not shown) was similar to the Ie characteristic but the value of If was sufficiently smaller than that of Ie.

Figure 8:
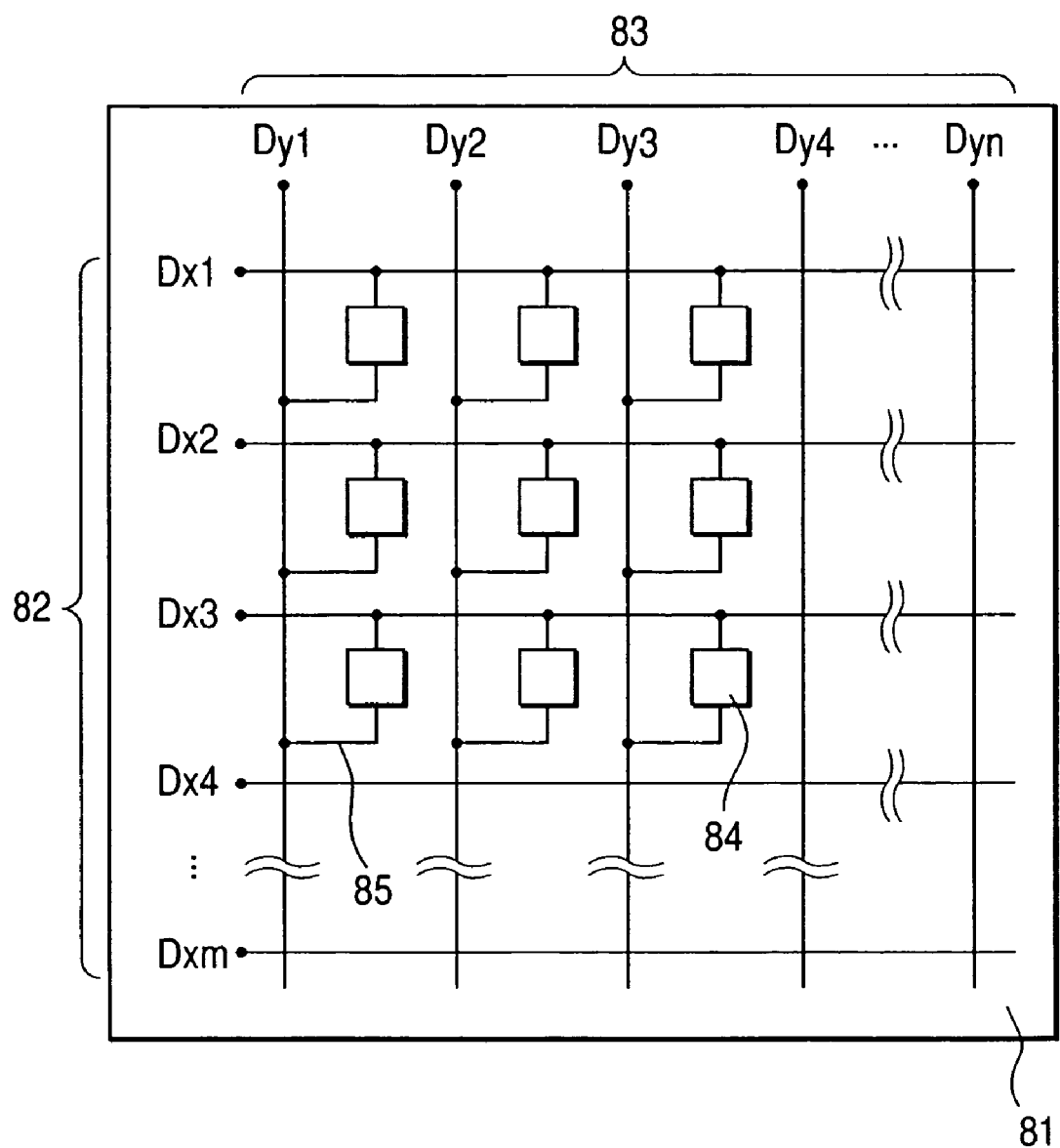
FIG. 8 is a diagram showing an example of the configuration of a passive matrix circuit using a plurality of electron sources in accordance with the present invention.

An electron source obtained by arranging a plurality of the electron-emitting devices in accordance with the present invention will be described with reference to FIG. 8. In FIG. 8 are illustrated an electron source substrate 81, X-direction wiring 82, Y-direction wiring 83, electron-emitting device 84 in accordance with the present invention, and a connecting conductor 85.

X-direction wiring 82 has m conductors DX1, DX2, . . . DXm, which may be constituted by, for example, a conductive metal formed by vacuum evaporation, printing, sputtering, or the like. The material, film thickness, and width of the wiring are selected according to a suitable design. Y-direction wiring 83 has n conductors DY1, DY2, . . . DYn and is formed in the same manner as X-direction wiring 82.

An interlayer insulating layer (not shown) is provided between the m conductors of X-direction wiring 82 conductors and the n conductors of Y-direction wiring 83 to electrically separate these conductors (each of m and n is a positive integer).

The interlayer insulating layer (not shown) is, for example, a $SiO_2$ layer formed by vacuum evaporation, printing, sputtering, or the like. For example, the interlayer insulating film is formed in the desired shape over the whole or part of the surface of the substrate 81 on which X-direction wiring 82 has been formed and the film thickness, material and fabrication method are selected to ensure withstanding against the potential difference at the intersections of the conductors of X-direction wiring 82 and Y-direction wiring 83 in particular. The conductors of X-direction wiring 82 and Y-direction wiring 83 are respectively extended outward as external terminals.

Pairs of electrodes (not shown) constituting electron-emitting devices 84 are electrically connected to the m conductors of X-direction wiring 82 and the n conductors of Y-direction wiring 83 by connecting conductors 85 made of a conductive metal or the like.

The materials forming wiring 82 and wiring 83, the material forming the connecting conductors 85 and the materials forming the pairs of device electrodes may be entirely constituted of common constituent elements or partially constituted of common constituent elements, or may be constituted of different constituent elements. These materials are selected from, for example, the above-described device electrode materials. If the materials of the device electrodes and the wiring materials are the same, the wiring conductors connected to the device electrodes can be considered to be device electrodes.

A scanning signal application means (not shown) for applying scanning signals for selecting the rows of electron-emitting devices 84 arranged in the X-direction is connected to X-direction wiring 82. On the other hand, a modulation signal generation means for modulating voltages applied to the columns of electron-emitting devices 84 arranged in the Y-direction according to input signals is connected to Y-direction wiring 83. The drive voltage applied to each electron-emitting device is supplied as a voltage corresponding to the difference between the scanning signal and the modulation signal applied to the element.

In the above-described arrangement, each device can be selected by using the passive-matrix wiring to be driven independently.

Figure 9:
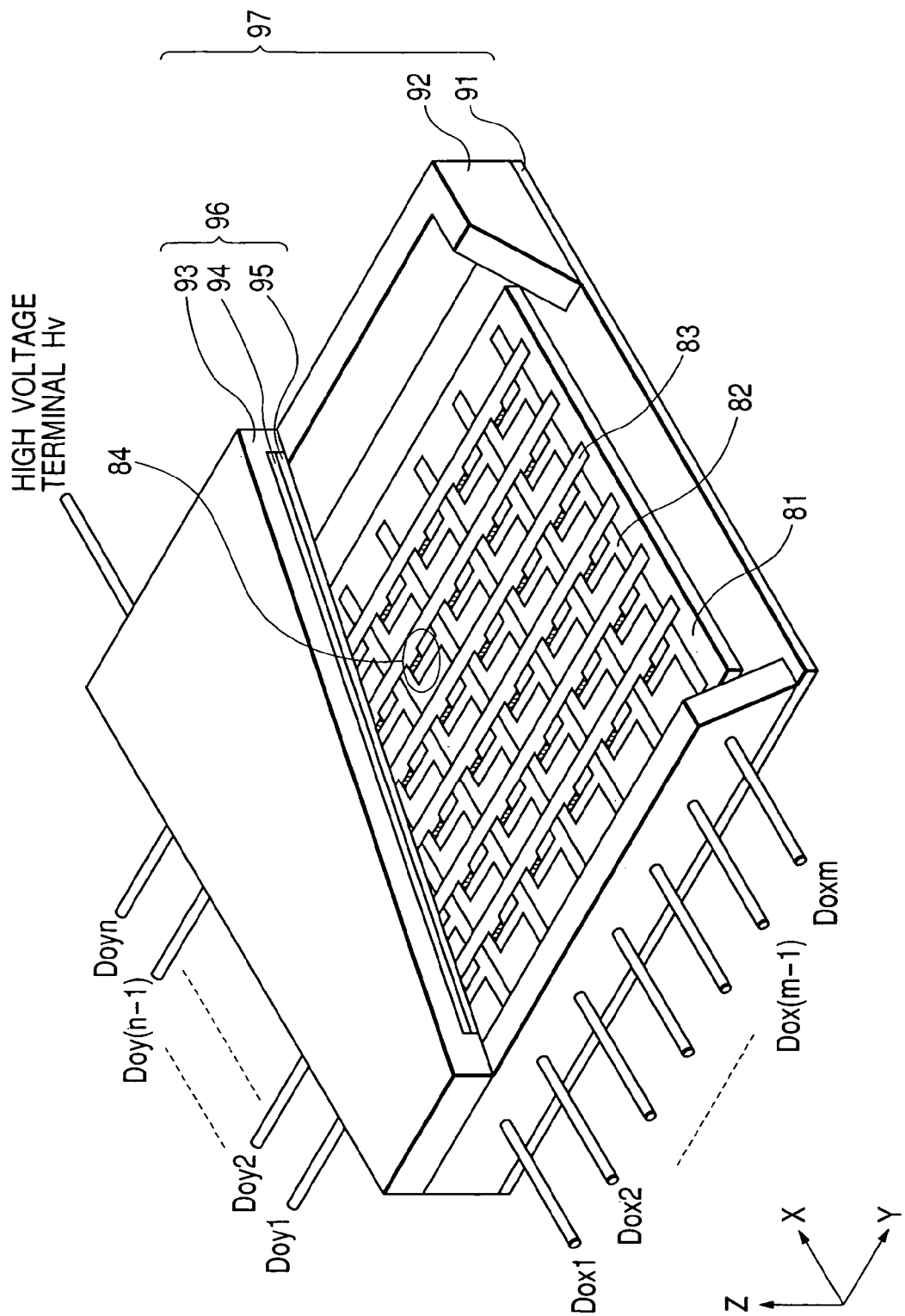
FIG. 9 is a diagram showing an example of the construction of an image forming panel using the electron source of the present invention.

An image forming apparatus constructed by using an electron source having such a passive matrix array will be described with reference to FIG. 9. FIG. 9 schematically shows an example of the display panel of the image forming apparatus. Referring to FIG. 9, a plurality of electron-emitting devices are disposed on an electron source substrate 81, which is fixed on a rear plate 91. A face plate 96 has a glass substrate 93, a phosphor film 94 provided as a light emitting member on the internal surface of the glass substrate 93, a metal back (anode) 95, etc. The rear plate 91 and the face plate 96 are connected to a supporting frame 92 by using frit glass or the like. An envelop 97 is formed by being seal-bonded by baking in, for example, atmospheric air, a vacuum or in nitrogen in the 400 to 500° C. temperature range for 10 minutes or longer.

The envelop 97, as described above, is constituted by the face plate 96, the supporting frame 92, and the rear plate 91. The rear plate 91 is provided mainly for the purpose of reinforcing the substrate 81. If the substrate 81 itself has sufficiently high strength, there is no need to separately provide the rear plate 91. That is, the supporting frame 92 may be-directly seal-bonded to the substrate 81 and the envelop 97 may be formed by the frame plate 96, the supporting frame 92 and the substrate 81. A supporting member (not shown) called a spacer may be provided between the face plate 96 and the rear plate 91 to enable the envelop 97 to have a sufficiently high strength for resisting atmospheric pressure.

Embodiments of the present invention will-be described below in detail.

(Embodiment 1)

FIG. 1A shows a top view of an electron-emitting device fabricated in this embodiment. FIG. 1B is a cross-sectional view taken along the line 1B—1B of FIG. 1A.

FIGS. 1A and 1B illustrate an insulating substrate 1, an extraction electrode 2 (gate), a cathode 3, and an emitter material 4.

The process of fabricating the electron-emitting device of this embodiment will be described in detail.

(Step 1)

A quartz substrate was used as substrate 1. After sufficiently cleansing the substrate, a 5 nm thick Ti film (not shown) and a 30 nm thick poly-Si film (arsenic doped) were successively deposited by sputtering on the substrate as gate electrode 2 and cathode 3.

Next, a resist pattern was formed by photolithography using a positive photoresist (AZ1500/ from Clariant Corporation).

Figure 5A:
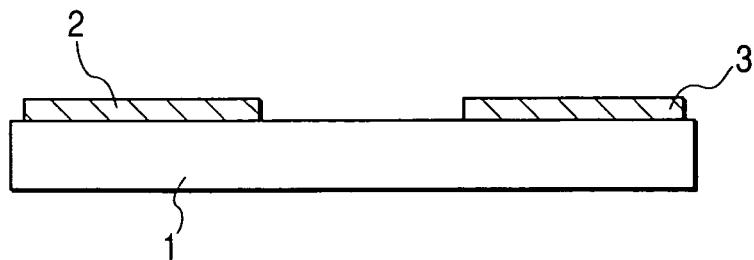
FIGS. 5A, 5B, 5C, and 5D are diagrams showing fabrication steps in a first embodiment of the present invention.

Thereafter, dry etching was performed on the poly-Si (arsenic doped) layer and Ti layer with the patterned photoresist used as a mask, $CF_4$ gas being used to etch the Ti layer. An extraction electrode 2 and a cathode 3 having a gap of 5 μm therebetween were thereby formed (FIG. 5A).

(Step 2)

Next, a Cr having a thickness of about 100 nm was deposited on the entire substrate by electron beam (EB) evaporation.

A resist pattern was formed by photolithography using a positive photoresist (AZ1500/from Clariant Corporation).

An opening corresponding to a region (100 μm square) where electron-emitting material 4 was to be provided was formed on the cathode 3 with the patterned photoresist used as a mask. Cr at the opening was removed by using a cerium nitrate etching solution.

After removing the resist, a complex solution prepared by adding isopropyl alcohol, etc., to a Pd complex was applied to the entire substrate by spin coating.

Figure 5B:
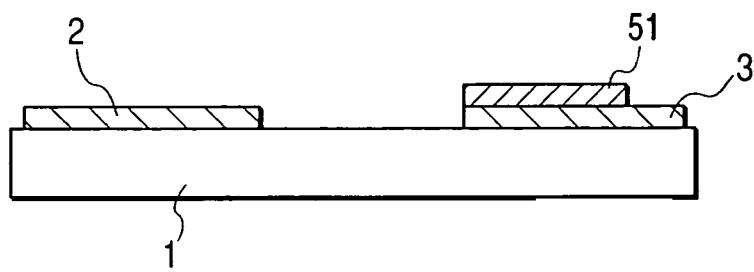

After application of the solution, a heat treatment was performed in atmospheric air at 300° C. to form a palladium oxide layer 51 having a thickness of about 10 nm. Thereafter, Cr was removed by using a cerium nitrate etching solution (FIG. 5B).

(Step 3)

Figure 5C:
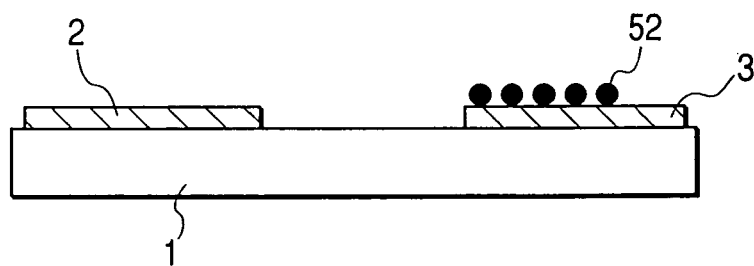

The substrate was baked at 200° C., atmospheric air was evacuated, and a heat treatment was then performed in 2% hydrogen flow diluted with nitrogen. At this stage, particles 52 having a diameter of about 3 to 10 nm were formed on the surface of the cathode 3. The density of the particles at this stage was estimated at about $10^{11}$ to $10^{12}$ particles/$cm^2$ (FIG. 5C).

(Step 4)

Figure 5D:
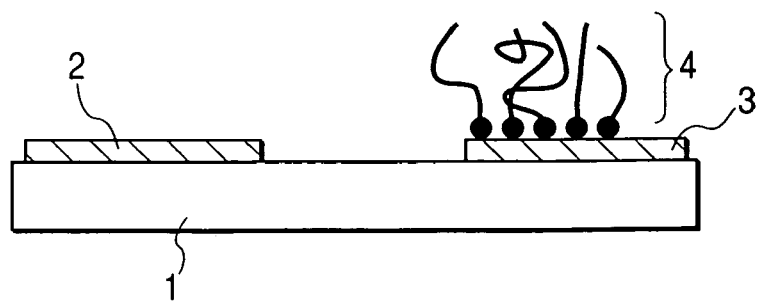

Subsequently, a heat treatment was performed in a 0.1% ethylene flow diluted with nitrogen at 500° C. for 10 minutes. The state after the heat treatment was observed with a scanning electron microscope to find that a multiplicity of fibrous carbon 4 having a diameter of about 10 to 25 nm and extending like fibers while curving or bending had been formed in the Pd-coated region. The thickness of the fibrous carbon layer was about 500 nm (FIG. 5D).

This electron-emitting device was set in the vacuum apparatus 60 shown in FIG. 6. A sufficiently high vacuum of about $2 \times 10^{-5}$ Pa was produced by the evacuating pump 62. Voltage Va=10 kV was applied as anode voltage to the anode 61 distanced by H=2 mm from the device, as shown in FIG. 6. Also, a pulse voltage of Vf=20 V was applied as drive voltage to the device. Device current If and electron emission current Ie thereby caused were measured.

Figure 7:
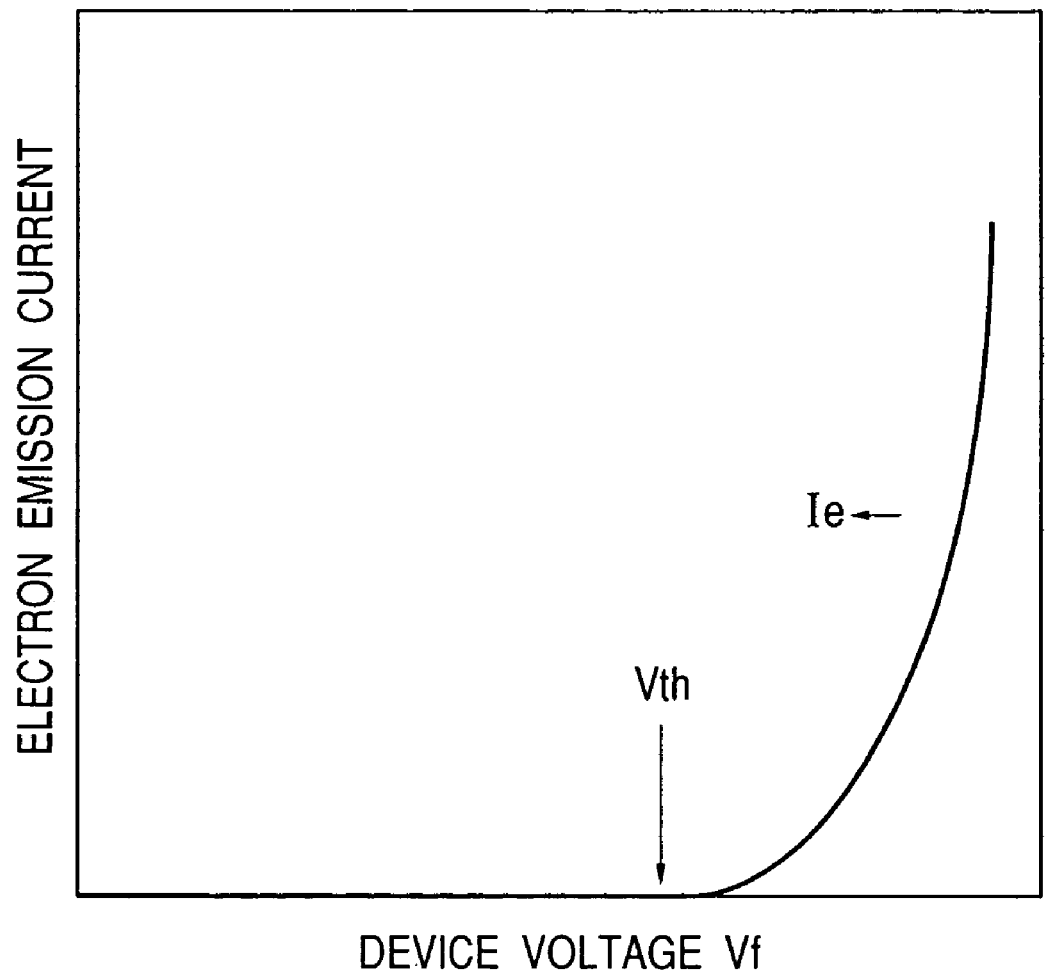
FIG. 7 is a diagram showing an operating characteristic of the basic electron-emitting device of the present invention.

The If and Ie characteristics of the electron-emitting device were as shown in FIG. 7. That is, Ie rises abruptly at a voltage about half the applied voltage, and a current of about 1 μA was measured as electron emission current Ie at a Vf value of 15 V. On the other hand, the If characteristic was similar to the Ie characteristic but the value of If was smaller than that of Ie by an order of magnitude or more.

The obtained beam had a generally rectangular shape having a longer side along the Y-direction and a shorter side in the X-direction. The beam width was measured with respect to different gaps of 1 μm and 5 μm between the electrodes 2 and 3 while Vf was fixed at 15 V and the distance H to the anode was fixed at 2 mm. Table 1 shows the results of this measurement.

TABLE 1

| | Va = 5 kV | Va = 10 kV |
|---|---|---|
| Gap: 1 μm | 60 μm in x-direction | 30 μm in x-direction |
| | 170 μm in y-direction | 150 μm in y-direction |
| Gap: 5 μm | 93 μm in x-direction | 72 μm in x-direction |
| | 170 μm in y-direction | 150 μm in y-direction |

It was possible to change the necessary electric field for driving by changing the fibrous carbon growth conditions. In particular, the average particle size of Pd particles formed by reduction of palladium oxide is related to the diameter of fibrous carbon thereafter grown. It was possible to control the average Pd particle size through the Pd density in the Pd complex coating and the rotational speed of spin coating.

The fibrous carbon of this electron-emitting device was observed with the transmission electron microscope to recognize a structure in which graphenes are layered in the fiber axis direction, as shown in the right-hand section of FIG. 12. The graphene stacking intervals (in the Z-axis direction) resulting from heating at a lower temperature, about 500° C. were indefinite and was 0.4 nm. As the heating temperature was increased, the grating intervals became definite. The intervals resulting from heating at 700° C. were 0.34 nm, which is close to 0.335 nm in graphite.

(Embodiment 2)

Figure 2A:
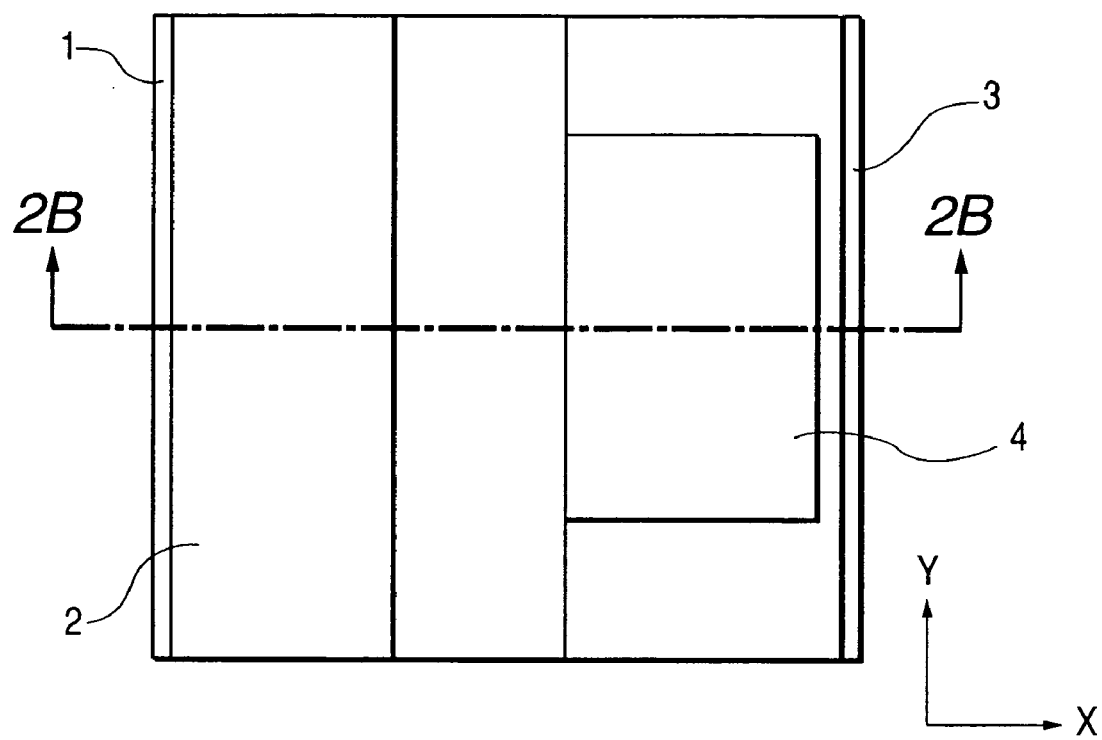
FIGS. 2A and 2B are diagrams showing a second embodiment of the present invention.
Figure 2B:
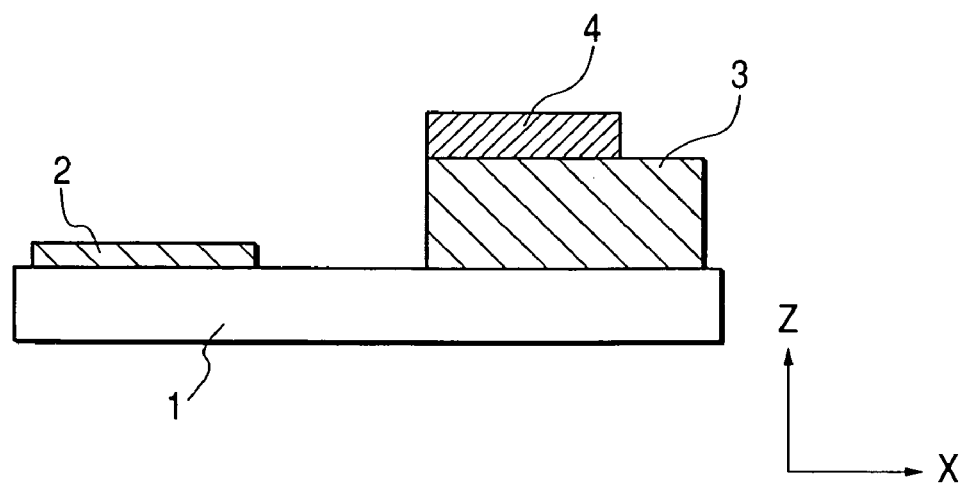

FIG. 2 shows a second embodiment of the present invention.

In this embodiment, an electron-emitting device was fabricated in the same manner as that in the first embodiment except that the cathode 3 corresponding to that in the first embodiment had a thickness of 500 nm and fibrous carbon provided as electron-emitting material 4 had a thickness of 100 nm. Currents If and Ie in the fabricated electron-emitting device were measured.

In this device arrangement, the electron emission point was positively heightened (toward the anode) relative to the gate electrode by increasing the thickness of the cathode 3.

Trajectories along which electrons impinge on the gate were thereby reduced, thereby preventing a reduction in efficiency and occurrence of a beam-thickening phenomenon.

Also in this device arrangement, the electron emission current Ie at Vf=20V was about 1 µA. On the other hand, the If characteristic was similar to the Ie characteristic but the value of If was smaller than that of Ie by two orders of magnitude.

The results of measurement of the beam diameter in this embodiment were substantially the same as those shown in Table 1.

(Embodiment 3)

Figure 3A:
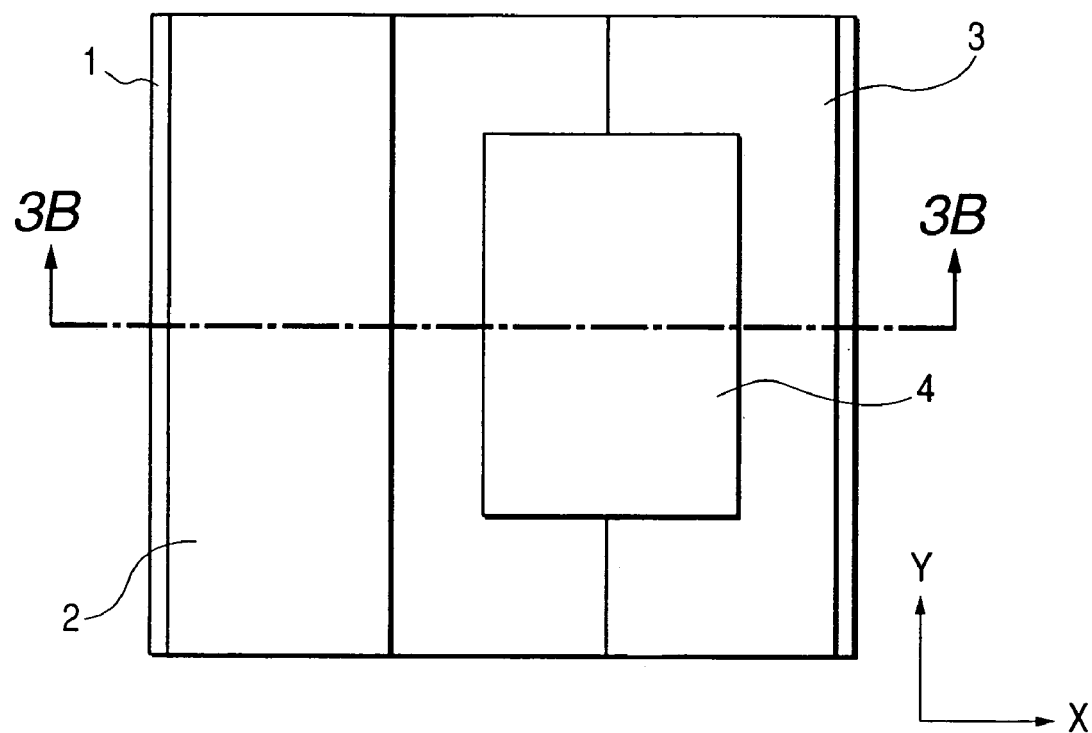
FIGS. 3A and 3B are diagrams showing a third embodiment of the present invention.
Figure 3B:
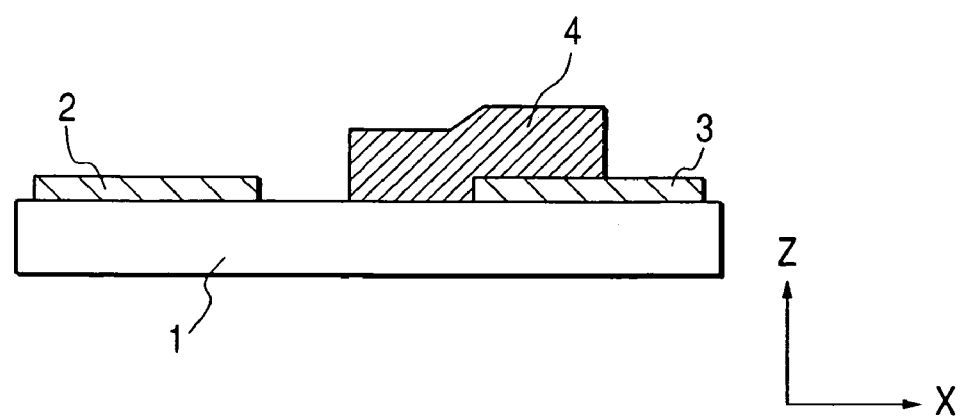

FIG. 3 shows a third embodiment of the present invention.

In this embodiment, in the step corresponding to step 2 in the first embodiment, palladium oxide 51 was provided on the cathode 3 and in the gap between the electrodes 2 and 3. Pd oxide was provided in the gap in such a manner as to extend from the cathode 3 to a point near the midpoint of the gap. Excepting step 2, this embodiment is the same as the first embodiment.

The electric field in the electron-emitting device of this embodiment was twice as strong as that in the first embodiment because the gap was reduced, thereby enabling the drive voltage to be reduced to about 8 V.

(Embodiment 4)

Figure 4A:
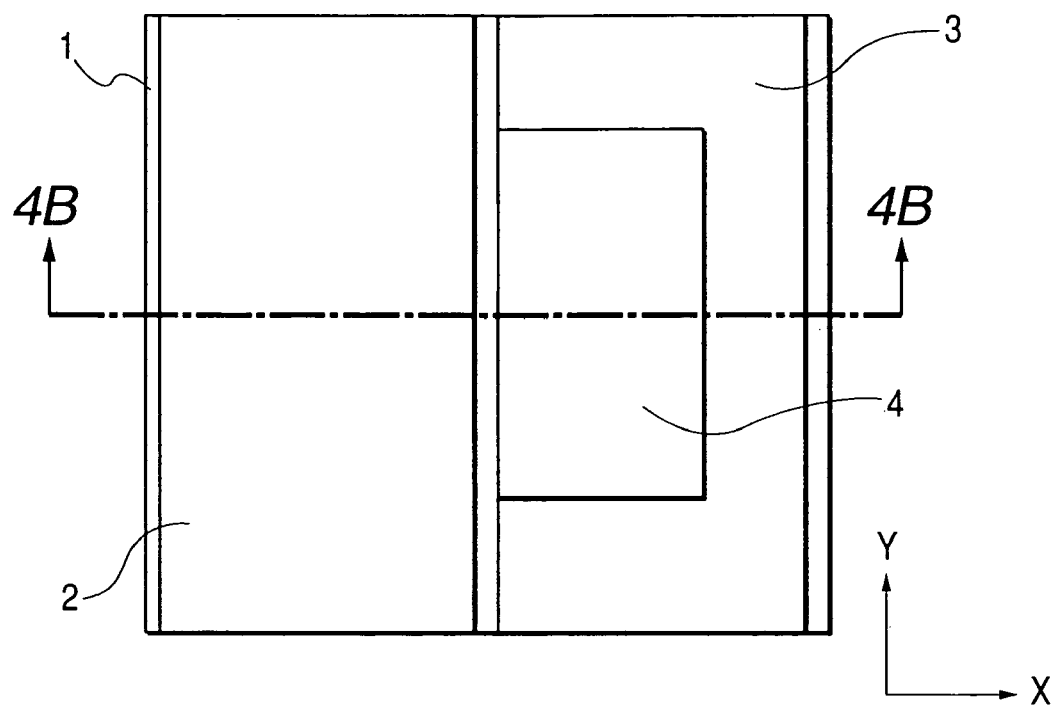
FIGS. 4A and 4B are diagrams showing a fourth embodiment of the present invention.
Figure 4B:
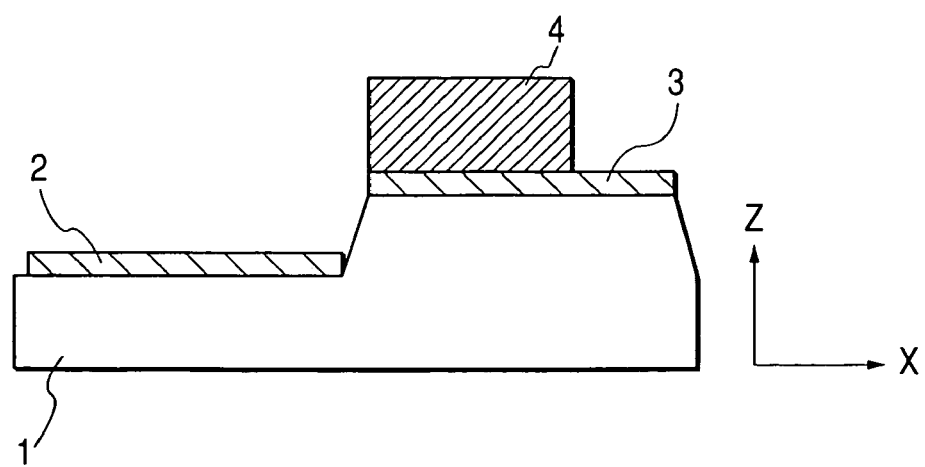

FIG. 4 shows a fourth embodiment of the present invention. In this embodiment step 1 and step 2 described above with respect to the first embodiment are changed as described below.

(Step 1)

A quartz substrate was used as substrate 1. After sufficiently cleansing the substrate, a 5 nm thick Ti film and a 30 nm thick poly-Si film (arsenic doped) were successively deposited by sputtering on the substrate as cathode 3.

Next, a resist pattern was formed by photolithography using a positive photoresist (AZ1500/from Clariant Corporation).

Next, dry etching was performed on the poly-Si layer and Ti layer by using $CF_4$ gas, with the patterned photoresist used as a mask. Cathode 3 was thereby formed.

The quartz substrate was then etched to a depth of about 500 nm by using a mixed acid formed of hydrofluoric acid and ammonium fluoride.

Subsequently, a 5 nm thick Ti film and a 30 nm thick Pt film were successively deposited on the substrate as gate electrode 2 by again performing sputtering. After removing the photoresist from the cathode, a resist pattern was again formed by using a positive photoresist (AZ1500/from Clariant Corporation) to form the gate electrode.

Next, dry etching was performed on the Pt layer and Ti layer by using Ar, with the patterned photoresist used as a mask. Electrode 2 was thereby formed so that the step formed between the electrodes functions as a gap.

Next, a resist pattern was formed on the cathode, a Ni film-having a thickness of about 5 nm was formed by resistance heating evaporation having a good straight-in effect, and oxidation was thereafter performed at 350° C. for 30 minutes.

This step was followed by the same steps as those in the first embodiment.

The above-described device arrangement-enabled formation of a finer gap such that electrons were effectively emitted at a lower voltage of about 6 V.

Because the height of the electron-emitting material 4 (film thickness) was increased relative to that of the gate electrode, electrons were drawn out not only from the upper portion of the electron-emitting material 4 but also from an intermediate portion. Thus, the arrangement in this embodiment has the effect of preventing a reduction in efficiency due to impingement of electrons on the gate electrode and occurrence of a beam-thickening phenomenon.

(Embodiment 5)

Figure 10:
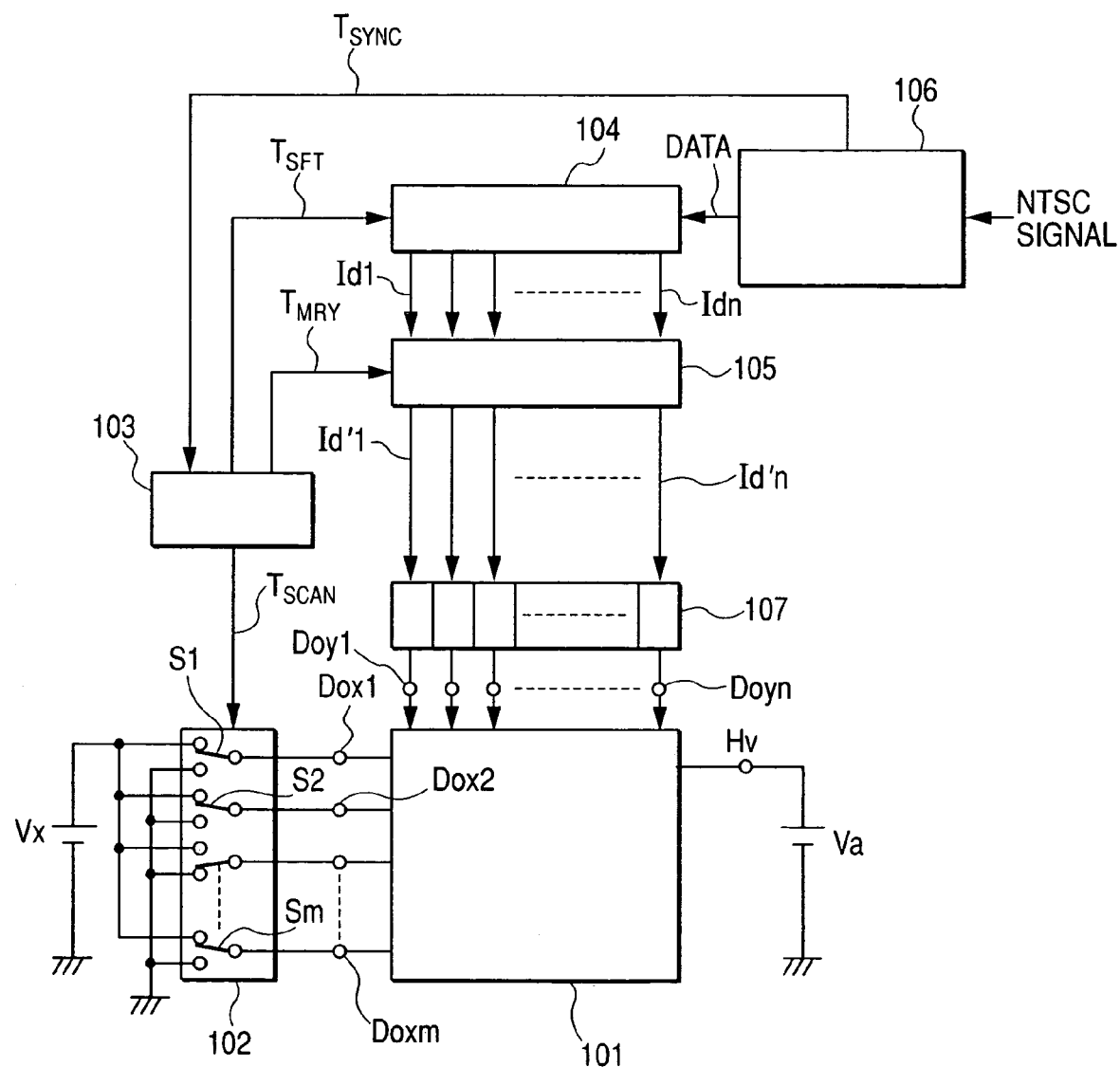
FIG. 10 is a diagram showing an example of a circuit for the image forming panel using the electron source of the present invention.

An electron source obtained by arranging a plurality of the electron-emitting devices fabricated the first embodiment and an image forming apparatus using this electron source will be described with reference to FIGS. 8, 9, and 10. In FIG. 8 are illustrated an electron source substrate 81, X-direction wiring 82, Y-direction wiring 83, electron-emitting devices 84 in accordance with the present invention, and connecting conductors 85.

The electron source with matrix wiring shown in FIG. 8, in which the device capacitance is increased by arranging a plurality of electron-emitting devices, has a problem that, even when a short pulse produced by pulse-width modulation is applied, the waveform is dulled or distorted by capacitive components to cause failure to obtain the necessary grayscale level, for example. In this embodiment, therefore, a structure is adopted in which an interlayer insulating layer is provided by the side of the electron-emitting region to limit the increase in capacitive components in regions other than the electron-emitting region.

Referring to FIG. 8, X-direction wiring 82 has m conductors DX1, DX2, . . . DXm, which has a thickness of about 1 µm and a width of 300 µm, and which is formed of an aluminum wiring material by evaporation. The material, film thickness, and width of the wiring conductors are selected according to a suitable design. Y-direction wiring 83 has n conductors DY1, DY2, . . . DYn, which has a thickness of 5 µm and width of 100 µm, and which is formed in the same manner as X-direction wiring 82. An interlayer insulating layer (not shown) is provided between the m conductors of X-direction wiring 82 and the n conductors of Y-direction wiring 83 to electrically separate these conductors (each of m and n is a positive integer).

The interlayer insulating layer (not shown) is, for example, a $SiO_2$ layer formed by sputtering or the like and having a thickness of about 0.8 µm. For example, the interlayer insulating film is formed in the desired shape over the whole or part of the surface of the substrate 81 on which X-direction wiring 82 has been formed. Specifically, the thickness of the interlayer insulating film is determined so as to ensure withstanding against the potential difference at the intersections of the conductors of X-direction wiring 82 and Y-direction wiring 83. The conductors of X-direction wiring 82 and Y-direction wiring 83 are respectively extended outward as external terminals.

Pairs of electrodes (not shown) constituting electron-emitting devices 84 are electrically connected to the in conductors of X-direction wiring 82 and the n conductors of Y-direction wiring 83 by connecting conductors 85 made of a conductive metal or the like.

A scanning signal application means (not shown) for applying scanning signals for selecting the rows of electron-emitting devices 84 arranged in the X-direction is connected to X-direction wiring 82. On the other hand, a modulation signal generation means for modulating voltages applied to the columns of electron-emitting devices 84 arranged in the Y-direction according to input signals is connected to Y-direction wiring 83. The drive voltage applied to each electron-emitting device is supplied as a voltage corresponding to the difference between the scanning signal and the modulation signal applied to the element. In the present invention, Y-direction wiring 83 is connected to the gate electrodes 2 of the electron-emitting devices described above with respect to the first embodiment, while X-direction wiring is connected to the cathodes 3 of the elements. This connection realizes a beam convergence effect which characterizes the present invention.

In the above-described arrangement, each element can be selected by using the passive-matrix wiring to be driven independently.

An image forming apparatus constructed by using an electron source having such a passive matrix array will be described with reference to FIG. 9. FIG. 9 is a diagram showing the display panel of the image forming apparatus.

Referring to FIG. 9, the electron source having the plurality of electron-emitting devices described above with reference to FIG. 8 is provided on an electron source substrate 81. The substrate 81 is fixed on a rear plate 91. A face plate 96 has a glass substrate 93, a phosphor film 94 provided as a light emitting member on the internal surface of the glass substrate 93, a metal back 95, etc. The rear plate 91 and the face plate 96 are connected to a supporting frame 92 by using frit glass or the like. An envelop 97 is formed by being seal-bonded by baking in a vacuum at about a temperature of 450° C. for 10 minutes. The electron-emitting devices 84 correspond to the electron-emitting regions shown in FIG. 9. X-direction wiring 82 and Y-direction wiring 83 are connected to the pairs of electrodes of the electron-emitting elements in this embodiment.

The envelop 97, as described above, is constituted by the face plate 96, the supporting frame 92, and the rear plate 91. A supporting member (not shown) called a spacer is provided between the face plate 96 and the rear plate 91 to enable the envelop 97 to have a sufficiently high strength for resisting atmospheric pressure.

After fabrication of the phosphor film, the metal back 95 is made by smoothing the inner surface of the phosphor film (ordinarily called "filming") and by thereafter depositing Al by vacuum evaporation or the like.

The face plate 96 further has a transparent electrode (not shown) provided on outer surface of the phosphor film 94 to improve the conductivity of the phosphor film 94.

The scanning circuit 102 will be described. The scanning circuit 102 includes M switching devices (schematically shown as S1 to Sm in the figure). Each of the switching devices S1 to Sm selects one of the output voltage from a direct-current voltage source Vx and 0 (V) (ground level). The switching devices S1 to Sm are respectively connected to terminals Dx1 to Dxm of the display panel 101. Each of the switching devices S1 to Sm operates on the basis of a control signal Tscan output from a control circuit 103, and may be a combination of a switching device such as a field-effect transistor (FET) and other components. In this example, the direct-current voltage source Vx is configured to output a constant voltage such that the drive voltage to be applied to a device which is not scanned on the basis of characteristics of the electron-emitting device (electron emitting threshold value voltage), is not higher than the electron-emitting threshold value voltage.

The control circuit 103 has the function of matching the operations of the components with each other to suitably perform display on the basis of input signals externally supplied. The control circuit 103 generates control signals Tscan, Tsft, and Tmry to the components on the basis of sync signal Tsync supplied from a sync signal separation circuit 106.

The sync signal separation circuit 106 is a circuit for separating sync signal components and luminance signal components from an NTSC television signal externally supplied. This circuit can be formed by using an ordinary frequency separation (filter) circuit, etc. The sync signal separated by the sync signal separation circuit 106 is formed of a vertical sync signal and a horizontal sync signal. However, it is shown as Tsync in the figure for convenience sake. Image luminance signal components separated from the television signal are shown as DATA signal for convenience sake. The DATA signal is input to a shift register 104.

The shift register 104 is a device for serial to parallel conversion, with respect to each image line, of the DATA signal which is input in time sequence. The shift register 104 operates on the basis of control signal Tsft supplied from the control circuit 103. (That is, control signal Tsft may be considered to be a shift clock for the shift register.) Data corresponding to one image line after serial to parallel conversion (corresponding to data for driving N electron-emitting devices) is output as N parallel signals Id1 to Idn from the shift register 104.

The line memory 105 is a storage device for storing data corresponding to one image line for a necessary time period. The line memory 105 stores the contents of the signals Id1 to Idn according to control signal Tmry supplied from the control circuit 103. The stored contents are output as I'd1 to I'dn to be input to a modulation signal generator 107.

The modulation signal generator 107 is a signal source for suitably modulating signals for driving the electron-emitting devices according to image data items I'd1 to I'dn. Output signals from the modulation signal generator 107 are applied to the electron-emitting devices in the display panel 111 through terminals Doy1 to Doyn.

As described above, each electron-emitting device to which the present invention can be applied has basic characteristics described below with respect to emission current Ie. That is, there is a definite thresh old value voltage Vth with respect to emission of electrons. Emission of electrons is caused only when a voltage higher than Vth is applied. When a voltage higher than the electron emission threshold value is applied to the electron-emitting device, the emission current changes according to changes in the applied voltage. Therefore, in a case where a voltage in the form of pulses is applied to the electron-emitting device, electron emission is not caused when the value of the applied voltage is lower than the electron emission threshold value, but an electron beam is output when the value of the applied voltage is equal to or higher than the electron emission threshold value. In this case, the strength of the electron beam can be controlled by changing the pulse crest value Vm. Also, the total amount of charge of the output electron beam can be controlled by changing the pulse width Pw.

Therefore, a voltage modulation method, a pulse-width modulation method or the like can be used as a method for modulating the electron-emitting device according to the input signal. If the voltage modulation method is carried out, a voltage modulation type of circuit capable of generating voltage pulses having a constant duration, and modulating the pulse crest value according to input data may be used as modulation signal generator 107.

If the pulse-width modulation method is carried out, a pulse-width modulation type of circuit capable of generating voltage pulses having a constant crest value and modulating the pulse width of the voltage pulses according to input data may be used as modulation signal generator 107.

Each of the shift register 104 and the line memory 105 used in this embodiment is of a digital signal type.

In this embodiment, a digital to analog converter circuit, for example, is used in the modulation signal generator 107 and an amplifier circuit, etc., are-added if necessary. For example, in the case where the pulse-width modulation method is used, a combination of a high-speed oscillator, a counter for counting the number of waves output from the oscillator, and a comparator for comparing the output value of the counter and the output value of the above-described memory is used in the modulation signal generator 107.

The configuration of the image forming apparatus described above is an example of the image forming apparatus to which the present invention can be applied. Various modifications and changes can be made therein on the basis of the technical spirit of the present invention. The input signal is not limited to the above-mentioned NTSC signal. Those in accordance with the PAL system and the SECAM system and other TV signals corresponding to a larger number of scanning lines (e.g., those for the MUSE system and other high-definition TV systems) may also be used.

Images were displayed on an image display apparatus made in accordance with this embodiment. High-luminance high-definition images had been displayed on the image display apparatus with stability for a long period of time.

According to the present invention, as described above, the specific capacitance of an electron-emitting device can be reduced and the drive voltage can also be reduced. An electron source having improved efficiency and a smaller beam size can be realized by using such an electron-emitting device.

An image forming apparatus having high resolution, e.g., a color flat-screen television can be realized by using the electron-emitting device in accordance with the present invention.

What is claimed is:

1. A method of manufacturing an electron-emitting device, comprising the steps of:
    providing a substrate on which a first electrode and a second electrode are disposed; and
    arranging a plurality of carbon fibers on the first electrode, so that a height of at least a part of the carbon fibers from the substrate is larger than a height of the second electrode from the substrate,
    wherein each carbon fiber has a plurality of graphenes stacked in a direction different from a direction perpendicular with respect to an axis direction of each carbon fiber.

2. The method according to claim 1, wherein the providing step includes processes of:
    arranging a plurality of catalyst particles so as to be connected to the first electrode; and
    growing the plurality of carbon fibers by a reaction between the plurality of catalyst particles and a gas containing carbon.

3. The method according to claim 2, wherein the catalyst particles contain a material selected from the group consisting of Pd, Ni, Fe and Co.

4. The method according to claim 1, wherein at least one or more of the carbon fibers are formed to have ends apart from a surface of the second electrode.

5. A method of manufacturing an electron source having a plurality of electron-emitting devices, each manufactured according to the method of claim 1.

6. A method of manufacturing an image forming apparatus comprising a substrate having a third electrode and a phosphor, and an electron source disposed in opposition to and spaced from the substrate, wherein the electron source is manufactured according to the method of claim 5.

7. A method of manufacturing an electron-emitting device, comprising the steps of:
    providing a substrate on which a first electrode and a second electrode are disposed; and
    arranging a plurality of carbon fibers on the first electrode, so that a height of at least a part of the carbon fibers from the substrate is larger than a height of the second electrode from the substrate,
    wherein each carbon fiber comprises a plurality of stacked graphenes intersecting with an axis of the carbon fiber.

8. The method according to claim 7, wherein the providing step includes processes of:
    arranging a plurality of catalyst particles so as to be connected to the first electrode; and
    growing the plurality of carbon fibers by a reaction between the plurality of catalyst particles and a gas containing carbon.

9. The method according to claim 8, wherein the catalyst particles contain a material selected from the group consisting of Pd, Ni, Fe and Co.

10. The method according to claim 7, wherein at least one or more of the carbon fibers are formed to have ends apart from a surface of the second electrode.

11. A method of manufacturing an electron source having a plurality of electron-emitting devices, each manufactured according to the method of claim 7.

12. A method of manufacturing an image forming apparatus comprising a substrate having a third electrode and a phosphor, and an electron source disposed in opposition to and spaced from the substrate, wherein the electron source is manufactured according to the method of claim 11.

13. A method of manufacturing an electron-emitting device, comprising the steps of:
    providing a substrate on which a first electrode and a second electrode are disposed; and
    arranging a plurality of carbon fibers on the first electrode, so that a height of at least a part of the carbon fibers from the substrate is larger than a height of the second electrode from the substrate,
    wherein each carbon fiber has a plurality of graphenes, and the graphenes are stacked along an axis direction of the carbon fiber.

14. The method according to claim 13, wherein the providing step includes processes of:
    arranging a plurality of catalyst particles so as to be connected to the first electrode; and
    growing the plurality of carbon fibers by a reaction between the plurality of catalyst particles and a gas containing carbon.

15. The method according to claim 14, wherein the catalyst particles contain a material selected from the group consisting of Pd, Ni, Fe and Co.

16. The method according to claim 13, wherein at least one or more of the carbon fibers are formed to have ends apart from a surface of the second electrode.

17. A method of manufacturing an electron source having a plurality of electron-emitting devices, each manufactured according to the method of claim 13.

18. A method of manufacturing an image forming apparatus comprising a substrate having a third electrode and a phosphor, and an electron source disposed in opposition to and spaced from the substrate, wherein the electron source is manufactured according to the method of claim 17.

19. A method of manufacturing an electron-emitting device, comprising the steps of:
    providing a first electrode disposed on a substrate;
    arranging a second electrode on the substrate; and arranging a plurality of carbon fibers on the first electrode, so that a height of at least a part of the carbon fibers from the substrate is larger than a height of the second electrode from the substrate, wherein each carbon fiber comprises a plurality of graphenes which are stacked so as not to be parallel to an axis direction of the fiber.

20. A method of manufacturing an electron source having a plurality of electron-emitting devices, each manufactured according to the method of claim 19.

21. A method of manufacturing an image forming apparatus comprising a substrate having a third electrode and a phosphor, and an electron source disposed in opposition to and spaced from the substrate, wherein the electron source is manufactured according to the method of claim 20.

22. A method of manufacturing an electron-emitting device to be arranged in opposition to an anode electrode, the electron-emitting device having on a surface of a substrate a cathode electrode, a gate electrode, and a fiber containing carbon as a main ingredient arranged on the cathode electrode, the method comprising steps of:

(a) preparing the substrate being insulating and having on the surface thereof, the cathode electrode having a catalyst on a surface thereof, and the gate electrode arranged separately from the cathode electrode; and (b) forming, on the cathode electrode, by decomposing hydrocarbon gas according to a heating process using the catalyst, as the fiber containing carbon as a main ingredient, a fiber having a plurality of graphenes that are not parallel to an axis direction of the fiber and being stacked in the axis direction of the fiber, so that the fiber has a portion which is positioned at a shorter distance from the anode electrode rather than is a distance between the anode electrode and the gate electrode.

23. A method of manufacturing an image display apparatus comprising a plurality of electron-emitting devices and phosphor, wherein each of the electron-emitting devices is manufactured by the method according to claim 22.

* * * * *

UNITED STATES PATENT AND TRADEMARK OFFICE
CERTIFICATE OF CORRECTION

PATENT NO. : 7,186,160 B2
APPLICATION NO. : 10/799859
DATED : March 6, 2007
INVENTOR(S) : Takeo Tsukamoto It is certified that error appears in the above-identified patent and that said Letters Patent is hereby corrected as shown below:

ON THE TITLE PAGE ITEM (56) REFERENCES CITED:

Item 56 U.S. Patent Documents,
"5,382,867 A 1/1995 Yuji et al." should read --5,382,867 A 1/1995 Maruo et al.--,
"2002/0009637 A1 1/2002 Murakamiet al." should read --2002/0009637 A1 1/2002 Murakami et al.--; and Item 56 Foreign Patent Documents,
"EP 0 989 084 A2 3/2000" should read --EP 0 986 084 A2 3/2000--,
"JP WO 89/07163 8/1989" should read --WO WO 89/07163 8/1989--; and Item 56 Other Publications,
T. Guo et al.,: "Single- Walled" should read --Single-Walled--,
A.C. Dillon et al.,: "Single- Walled" should read --Single-Walled--,
Delete "C.A. Spindt et al., ...pp. 5248-5263." second occurrence,
G. Dittmer,: "Thin Film"," should read --Thin Films",--,
A.M. Rao et al.,: Delete "of", and
A.M. Rao et al.,: "Letter," should read --Letters,--.

COLUMN 5:

Line 29, "so-that" should read --so that--.

COLUMN 6:

Line 50, "AS" should read --As--.

COLUMN 8:

Line 18, "10 nm" should read --10 nm and--.

COLUMN 10:

Line 44, "improved-reliability." should read --improved reliability.--; and
Line 52, "No," should read --Ni,--.

UNITED STATES PATENT AND TRADEMARK OFFICE
CERTIFICATE OF CORRECTION

| | |
|---|---|
| PATENT NO. | : 7,186,160 B2 |
| APPLICATION NO. | : 10/799859 |
| DATED | : March 6, 2007 |
| INVENTOR(S) | : Takeo Tsukamoto |

It is certified that error appears in the above-identified patent and that said Letters Patent is hereby corrected as shown below:

COLUMN 11:

Line 7, "case." should read --cases.--;
    Line 20, "a" first occurrence should read --an--; and
    Line 41, "field)" should read --field))--.

COLUMN 12:

Line 59, "envelop" should read --envelope--; and
    Line 63, "envelop" should read --envelope--.

COLUMN 13:

Line 2, "be-directly" should read --be directly--;
    Line 3, "envelop" should read --envelope--;
    Line 7, "envelop" should read --envelope--; and
    Line 9, "will-be" should read --will be--.

COLUMN 14:

Line 50, "was" should read --were--.

COLUMN 15:

Line 56, "film-having" should read --film having--; and
    Line 63, "arrangement-enabled" should read --arrangement enabled--.

COLUMN 16:

Line 9, "fabricated" should read --fabricated according to--; and
    Line 54, "in" should read --m--.

COLUMN 17:

Line 23, "envelop" should read --envelope--;
    Line 30, "envelop" should read --envelope--;
    Line 34, "envelop" should read --envelope--;
    Line 41, "on" should read --on the--; and
    Line 46, "voltage" should read --voltages--.

UNITED STATES PATENT AND TRADEMARK OFFICE
CERTIFICATE OF CORRECTION

PATENT NO. : 7,186,160 B2
APPLICATION NO. : 10/799859
DATED : March 6, 2007
INVENTOR(S) : Takeo Tsukamoto It is certified that error appears in the above-identified patent and that said Letters Patent is hereby corrected as shown below:

COLUMN 18:

Line 37, "thresh old" should read --threshold--.

COLUMN 19:

Line 3, "are-added" should read --are added--.

Signed and Sealed this

Twentieth Day of May, 2008

JON W. DUDAS
*Director of the United States Patent and Trademark Office*